(12) United States Patent
Saijo et al.

(10) Patent No.: US 8,270,729 B2
(45) Date of Patent: Sep. 18, 2012

(54) IMAGE AUTHENTICATING APPARATUS, IMAGE AUTHENTICATING METHOD, RECORDING MEDIUM, ELECTRONIC DEVICE, AND CIRCUIT SUBSTRATE

(75) Inventors: Masashi Saijo, Kawasaki (JP); Kenichi Haruki, Kawasaki (JP); Kyoko Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 11/617,075

(22) Filed: Dec. 28, 2006

(65) Prior Publication Data

US 2008/0031495 A1 Feb. 7, 2008

(30) Foreign Application Priority Data

Aug. 7, 2006 (JP) ................................. 2006-214825

(51) Int. Cl.
*G06K 9/68* (2006.01)
*G06K 9/62* (2006.01)
*G06K 9/74* (2006.01)
(52) U.S. Cl. ......... 382/218; 382/209; 382/214; 382/217
(58) Field of Classification Search ............. 348/333.01, 348/333.02, 333.03; 382/118, 209, 214, 382/217, 218, 284; 128/922
See application file for complete search history.

(56) References Cited

U.S. PATENT DOCUMENTS

| 5,291,889 | A | * | 3/1994 | Kenet et al. | 600/425 |
|---|---|---|---|---|---|
| 5,432,864 | A | * | 7/1995 | Lu et al. | 382/118 |
| 6,101,405 | A | | 8/2000 | Yasuda et al. | |
| 6,427,022 | B1 | * | 7/2002 | Craine et al. | 382/128 |
| 7,162,063 | B1 | * | 1/2007 | Craine et al. | 382/128 |
| 2001/0026632 | A1 | * | 10/2001 | Tamai | 382/116 |
| 2004/0037468 | A1 | * | 2/2004 | Morishima et al. | 382/218 |
| 2004/0100572 | A1 | * | 5/2004 | Kim | 348/333.01 |
| 2005/0179791 | A1 | * | 8/2005 | Iga | 348/231.6 |

FOREIGN PATENT DOCUMENTS

JP 5-108808 A 4/1993

(Continued)

OTHER PUBLICATIONS

"JP Office Action", mailed Aug. 23, 2011, from JP Patent Office for corresponding JP Patent Appl. No. 2006-214825 with partial English translation.
"Japanese Office Action" mailed by JPO and corresponding to Japanese application No. 2006-214825 on Apr. 5, 2011, with English translation.
English-language Translation of relevant portions of JP-5-108808-A.
Japanese Office Action mailed Jan. 24, 2012 for corresponding Japanese Application No. 2006-214825, with Partial English-language Translation.

*Primary Examiner* — Anand Bhatnagar
*Assistant Examiner* — Soo Park
(74) *Attorney, Agent, or Firm* — Fujitsu Patent Center

(57) ABSTRACT

The invention to be provided relates to focusing control for obtaining a detected image necessary for image authentication. Through the focusing control, a lens is controlled to be located at an optimum position upon starting authentication. An image authenticating apparatus compares a detected image with a recorded image to carry out authentication using the detected image and the recorded image. The apparatus includes an image-capturing unit (camera unit) that obtains the detected image by capturing an image of a photographed subject, a display unit (image display unit) that displays the detected image on a screen displaying a target image showing the outline of a portion to be detected, and a controlling unit (image processing unit) that controls the lens of the image-capturing unit to locate the lens at a given focusing position relative to the photographed subject upon obtaining the detected image.

7 Claims, 25 Drawing Sheets

FOREIGN PATENT DOCUMENTS

| | | | |
|---|---|---|---|
| JP | 06319130 A * | 11/1994 | |
| JP | 11-047119 | 2/1999 | |
| JP | 2001-273498 A | 10/2001 | |
| JP | 2001-326841 | 11/2001 | |

* cited by examiner

FIG.23
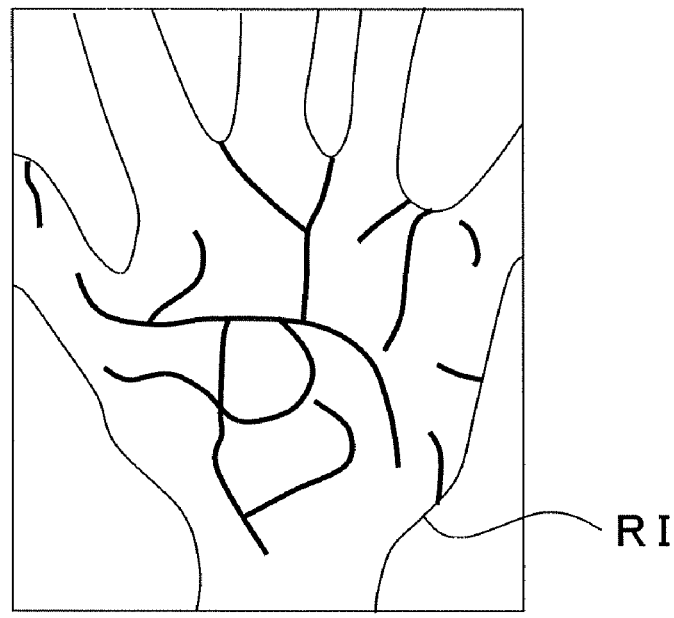
(A)
RI
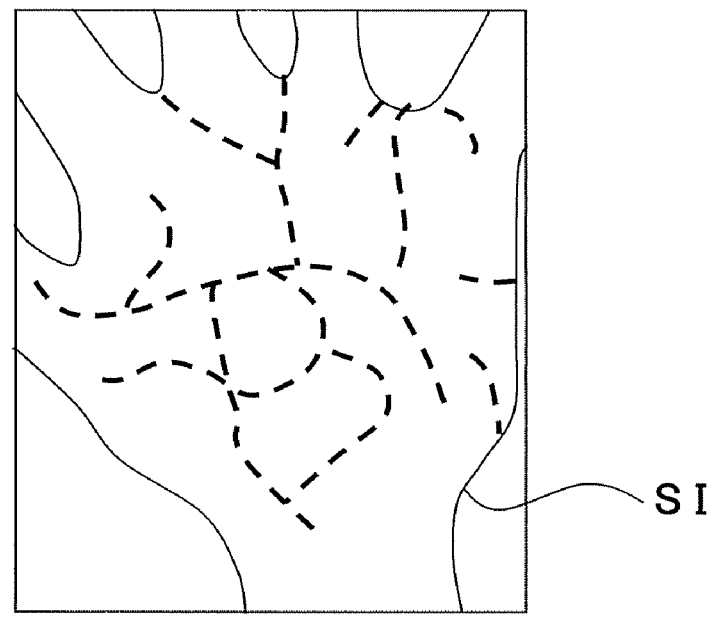
(B)
SI

IMAGE AUTHENTICATING APPARATUS, IMAGE AUTHENTICATING METHOD, RECORDING MEDIUM, ELECTRONIC DEVICE, AND CIRCUIT SUBSTRATE

CROSS-REFERENCE TO RELATED APPLICATIONS

This application is based upon and claims the benefit of priority from the prior Japanese Patent Application No. 2006-214825, filed on Aug. 7, 2006, the entire contents of which are incorporated herein by reference.

BACKGROUND OF THE INVENTION

1. Field of the Invention

The present invention relates generally to focusing control for obtaining a detected image used for image authentication that determines on whether the detected image represents the authentic person or another person by a process of detecting the features of a living body expressed in fingerprints or veins in the form of an image and comparing the detected image with a recorded image, and, more particularly, to an image authenticating apparatus, an image authenticating method, an image authenticating program, a recording medium, an electronic device, and a circuit substrate that guide a portion to be detected to a recommended position for image capturing to take in a detected image.

2. Description of the Related Art

In conventional image authentication on the veins of a palm to determine on whether the palm belongs to an authentic person or another person, a recoded image RI, as shown in FIG. 23(A), is compared with a detected image SI, as shown in FIG. 23(B), and whether the detected image SI matches the recorded image RI is determined. In such image authentication, for example, an image of the palm to be authenticated is captured by applying near-infrared rays to the palm and causing the rays to reflect on the palm to obtain a vein image that shows the position and form of the veins through the intensity/weakness of the reflected infrared rays. This vein image is used as a recorded image and as a detected image. The form of veins, like the same of fingerprints, retinas, face, DNA, etc., is suitable for being handled as identification data of an individual, thus used for individual authentication.

Regarding with such image authentication, Japanese Patent Application Laid-Open Publication No. 2001-326841 discloses a technique that a range for executing palm print recognition is exhibited on a display while a frame showing the outer edge of the recognition range is also exhibited on the display to clearly demonstrate the recognition range, and that a distance between a camera and a palm is adjusted (paragraph numbers 0038, 0039, 0040, FIG. 4, FIG. 6, etc.). Japanese Patent Application Laid-Open Publication No. 1999-47119 discloses a technique that a ring for preventing a left/right or back/forth shift of a hand to be detected is provided to position the hand relative to a detection terminal (paragraph numbers 0048 to 0050, ABSTRACT, FIG. 4, FIG. 5, etc.).

According to the technique disclosed in Japanese Patent Application Laid-Open Publication No. 2001-326841, while the frame showing the outer edge of the recognition range is exhibited on the display, a person requesting living body authentication still have to go through extreme cumbersome operations of minding the frame as the recognition range and adjusting the distance between a camera and the palm before obtaining a proper image. On the other hand, the technique disclosed in Japanese Patent Application Laid-Open Publication No. 1999-47119 restricts the degree of freedom of the hand to be detected, if in a moment, thus raising a concern of giving a person requesting authentication an unpleasant feeling.

FIG. 24 depicts an automated teller machine (ATM) 400 provided with an image-capturing device 404 adjacent to a customer operating panel 402, which image-capturing device 404 captures an image of a palm of a user. The image-capturing device 404 has a sensor guide 408 attached to the front face of a sensor unit 406, where the sensor guide 408 guides the palm of the user to the sensor unit 406. This sensor guide 408 is so constructed that the user puts his or her wrist on a flat portion 410 of the sensor guide 408 to locate the palm for image capturing at an image-capturing position on the sensor unit 406. The image-capturing device 404, however, has such a disadvantage that the positioning sensor guide 408 projects out of the image-capturing device 404, and that the palm may not be set at an optimum position even if the writs is kept supported on the sensor guide 408 because of physical differences among individuals.

An image-capturing device 414 shown in FIG. 25 has a fingertip guide 412 erected at the rear of the sensor unit 406, which fingertip guide 412 is provided to allow a user to bring his or her fingertips into contact with the fingertip guide 412 to locate the palm at the image-capturing position on the sensor unit 406. The image-capturing device 414, however, has a disadvantage that the positioning sensor guide 408 and the fingertip guide 412 project out of the image-capturing device 414, and that the palm may not be set at an optimum position even if the wrist is kept supported on the sensor guide 408 or the fingertips are brought in contact with the fingertip guide 412 because of physical differences among individuals.

As described above, various devices for positioning or settling have been devised to take a proper image of a person's hand free to move. For a portable device, especially, the above guide members are improper for installation. This leads to a problem that obtaining a detected image coinciding in position with a recorded image while both a portable device and a person's hand are free to move, is troublesome work.

No disclosure or hint has been presented to solve such a problem, and Patent Application Laid-Open Publication Nos. 2001-326841 and 1999-47119 disclose or hint no solution to the problem, either.

SUMMARY OF THE INVENTION

An object of the present invention is to control a lens to locate it at an optimum position upon starting authentication in a process relating to focusing control for obtaining a detected image necessary for image authentication.

Another object of the present invention is to improve the precision of authentication by obtaining a detected image optimum to the authentication in a process relating to focusing control for obtaining the detected image necessary for image authentication.

To achieve the above objects, according to the present invention, a target image having the outline matching that of a recorded image and a detected image are superposed and displayed on the screen of a display, and the lens of an image-capturing unit is controlled to be located at a given focusing position upon obtaining the detected image. Specifically, when the position or form of the detected image, which is superposed on the target image, is shifted from that of the target image, a user manipulates the detected image to match it to the target image in position and form after grasping the relation in size between the detected image and the target image, the relative positional relation between a portion to be detected and the image-capturing unit, and the form of the detected image, and then controls the lens of the image-capturing unit to locate the lens at the focusing position, where a detected image optimum to authentication can be obtained, upon obtaining the detected image. As a result, the detected image coinciding in position and/or form with the recorded image is obtained to improve authentication precision.

To attain the above objects, according to a first aspect of the present invention there is provided an image authenticating apparatus that compares a detected image obtained by image capturing with a recorded image to carry out authentication using the detected image and recorded image, the apparatus comprising an image-capturing unit that obtains the detected image by capturing an image of a photographed subject; a display unit that displays the detected image on a screen displaying a target image showing an outline of a portion to be detected; and a controlling unit that controls a lens of the image-capturing unit to locate the lens at a given focusing position relative to the photographed subject upon obtaining the detected image.

To attain the above objects, in the image authenticating apparatus, the image-capturing unit may be focused on the photographed subject in case where the detected image is matched to the target image displayed on the screen of the display unit, the detected image may be taken in in case where the detected image is matched to the target image displayed on the screen of the display unit.

To attain the above objects, according to a second aspect of the present invention there is provided an image authenticating method for comparing a detected image obtained by image capturing with a recorded image to carry out authentication using the detected image and recorded image, the method comprising the steps of obtaining the detected image by capturing an image of a photographed subject; displaying the detected image on a screen displaying a target image showing an outline of a portion to be detected; and controlling a lens of an image-capturing unit to locate the lens at a given focusing position relative to the photographed subject upon obtaining the detected image.

To attain the above objects, the image authenticating method may further include a step of bringing the photographed subject into focus in case where the detected image is matched to the target image displayed on the screen; the image authenticating method may further include a step of taking in the detected image in case where the detected image is matched to the target image displayed on the screen.

To attain the above objects, according to a third aspect of the present invention there is provided an image authenticating program for causing a computer to execute a process of comparing a detected image obtained by image capturing with a recorded image to carry out authentication using the detected image and recorded image, the program comprising the steps of obtaining the detected image by capturing an image of a photographed subject; displaying the detected image on a screen displaying a target image showing an outline of a portion to be detected; and controlling a lens of an image-capturing unit to locate the lens at a given focusing position relative to the photographed subject upon obtaining the detected image.

To attain the above objects, the image authenticating program may further include a step of bringing the photographed subject into focus in case where the detected image is matched to the target image displayed on the screen; the image authenticating program may further include a step of taking in the detected image in case where the detected image is matched to the target image displayed on the screen.

To attain the above objects, according to a fourth aspect of the present invention there is provided a computer-readable recording medium that stores an image authenticating program for causing a computer to execute a process of comparing a detected image obtained by image capturing with a recorded image to carry out authentication using the detected image and recorded image, the image authenticating program stored in the recording medium comprising the steps of obtaining the detected image by capturing an image of a photographed subject; displaying the detected image on a screen displaying a target image showing an outline of a portion to be detected; and controlling a lens of an image-capturing unit to locate the lens at a given focusing position relative to the photographed subject upon obtaining the detected image.

To attain the above objects, the stored program may further include a step of bringing the photographed subject into focus in case where the detected image is matched to the target image displayed on the screen; the stored program may further include a step of taking in the detected image in case where the detected image is matched to the target image displayed on the screen.

To attain the above objects, according to a fifth aspect of the present invention there is provided an electronic device that compares a detected image obtained by image capturing with a recorded image to carry out authentication using the detected image and recorded image, the device comprising an image-capturing unit that obtains the detected image by capturing an image of a photographed subject; a display unit that displays the detected image on a screen displaying a target image showing an outline of a portion to be detected; and a controlling unit that controls a lens of the image-capturing unit to locate the lens at a given focusing position relative to the photographed subject upon obtaining the detected image.

To attain the above objects, in the electronic device, the image-capturing unit may be focused on the photographed subject in case where the detected image is matched to the target image displayed on the screen of the display unit, the detected image may be taken in case where the detected image is matched to the target image displayed on the screen of the display unit.

To attain the above objects, according to a fifth aspect of the present invention there is provided a circuit substrate incorporated into an image authenticating apparatus that compares a detected image obtained by image capturing with a recorded image to carry out authentication using the detected image and recorded image, the substrate generating display output for displaying the detected image on a screen displaying a target image showing an outline of a portion of the detected image that is obtained by capturing an image of a photographed subject, and the substrate having a controlling unit that controls a lens of an image-capturing unit to locate the lens at a given focusing position relative to the photographed subject upon obtaining the detected image.

The features and advantages of the present invention are as follows.

(1) The lens of an image-capturing unit is controlled to be located at a given focusing position upon obtaining a detected image from a photographed subject, so that a detected image optimum to authentication can be obtained.

(2) A detected image coinciding in position and/or form with a recorded image can be obtained easily only by matching a detected image to a target image.

(3) A detected image optimum to authentication in comparison with a recorded image can be obtained, so that an authentication process can be executed easily and authentication precision is improved.

Other objects, features, and advantages of the present invention will be understood more clearly by referring to the accompanying drawings and embodiments.

BRIEF DESCRIPTION OF THE DRAWINGS

FIG. 23 depicts conventional image authentication;

DETAILED DESCRIPTION OF THE PREFERRED EMBODIMENTS

First Embodiment

Figure 1:
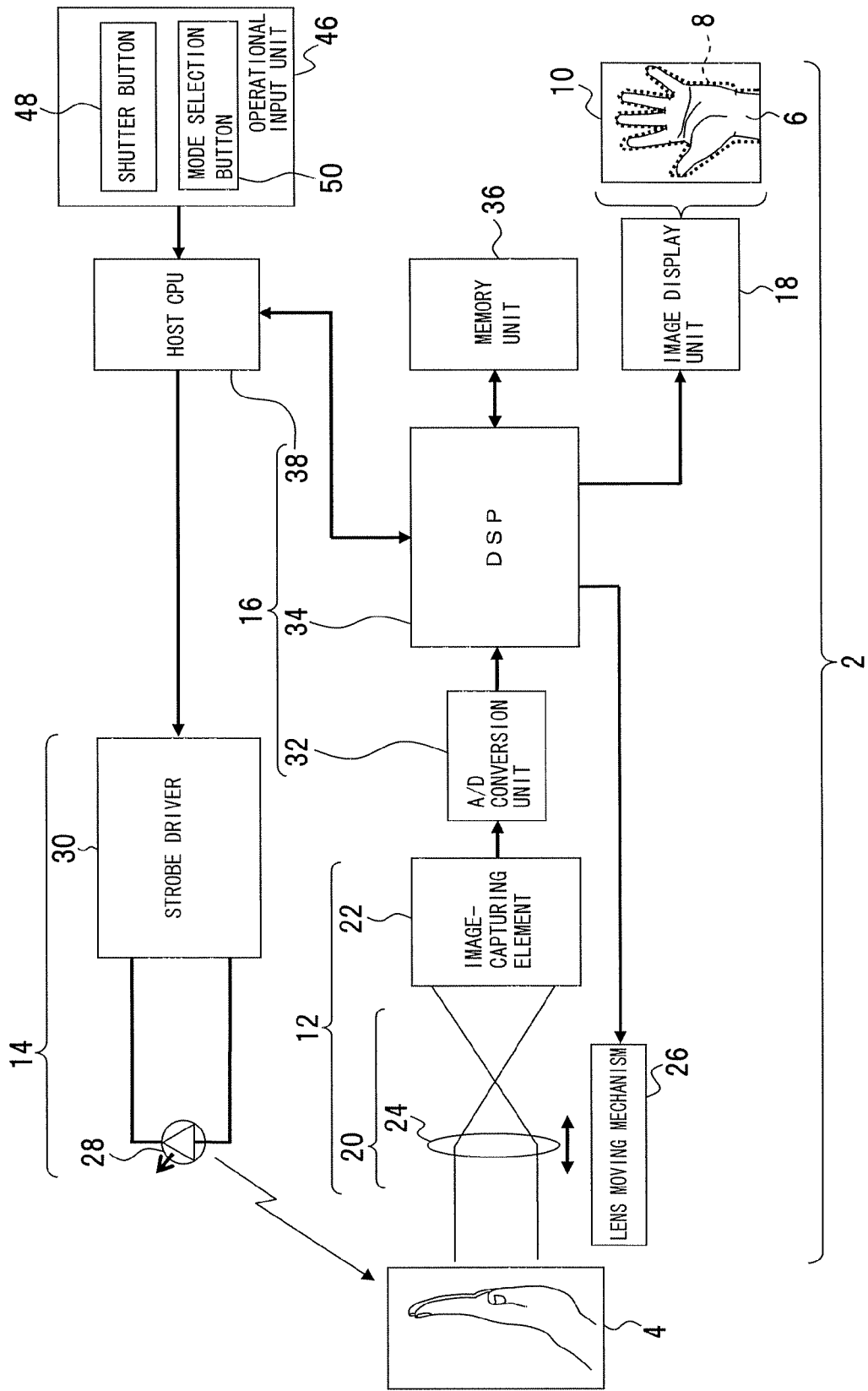
FIG. 1 depicts a structural example of an image authenticating apparatus according to a first embodiment.
Figure 2:
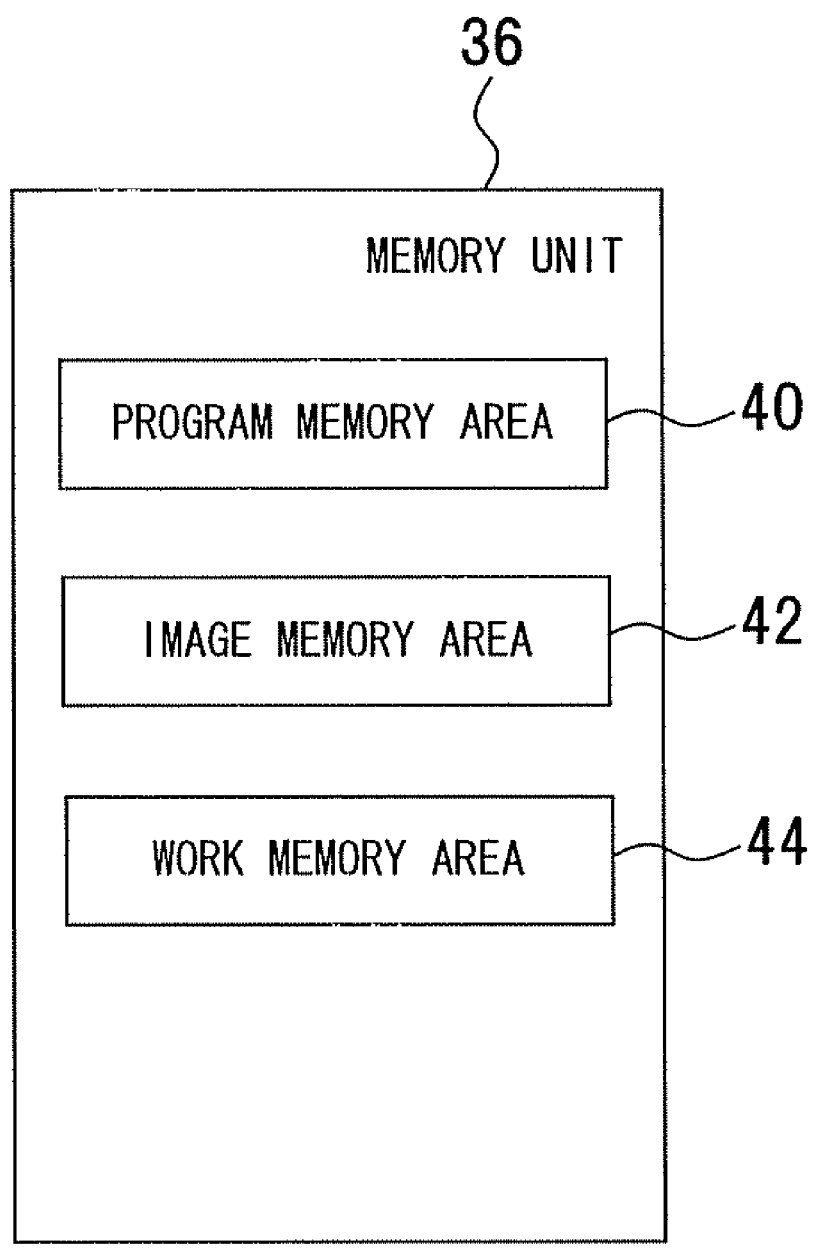
FIG. 2 depicts a structural example of a memory unit.
Figure 3:
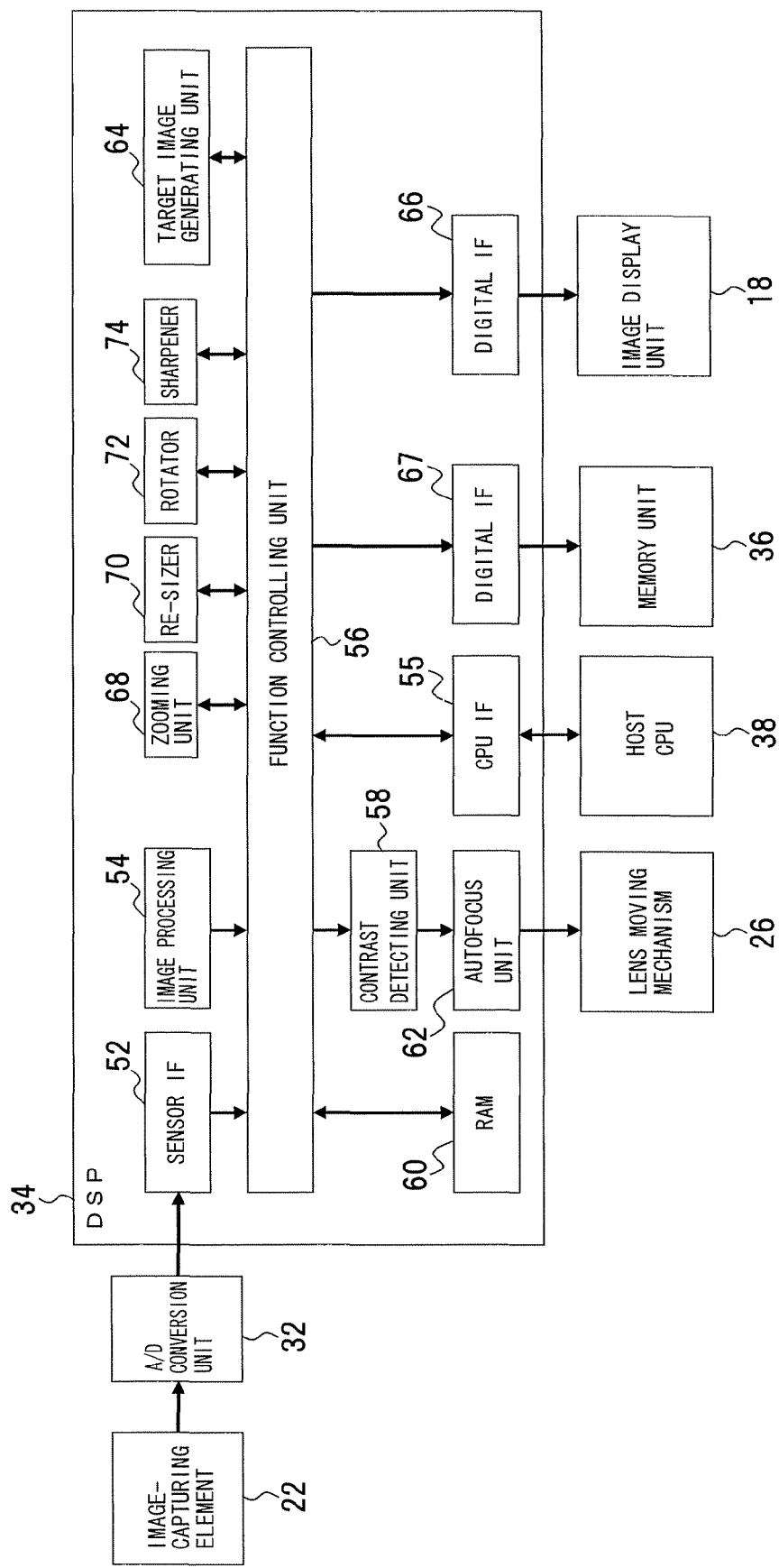
FIG. 3 depicts a structural example of a digital signal processor (DSP)

A first embodiment of the present invention will now be described with reference to FIGS. 1, 2, 3. FIG. 1 depicts a structural example of an image authenticating apparatus according to a first embodiment, FIG. 2 depicts a structural example of a memory unit, and FIG. 3 depicts a structural example of a digital signal processor (DSP).

The image authenticating apparatus 2 is installed in various electronic devices, such as a cellular phone, digital still camera, personal computer (PC), and automated teller machine (ATM), and is used for living body authentication executed in response to such a momentum element as the start of operation. The image authenticating apparatus 2 applies to an authentication process of determining on whether a detected image 6 represents an authentic person by comparing the detected image 6, which is obtained by capturing an image of a photographed subject 4 that is a detection subject, such as a palm, with a recorded image. The image authenticating apparatus 2 displays the detected image 6 and a target image 8 simultaneously on a screen 10, the target image 8 showing the outline of a subject portion and/or of the recorded image and a recommendable position or recommendable form in image-capturing as well, so that the detected image 6 is guided to the recommendable position and/or to the recommendable form using the target image 8 to enable to take in the detected image 6.

In the first embodiment, a person's palm is exhibited as an example of the photographed subject 4. A detection subject, however, is not limited to a palm, but may be fingers. While the target image 8 is exhibited as the outline of an open palm and fingers in the embodiment, the shape of the target image 8 is not limited to the one shown in the embodiment, but is applicable when matched to a specific part or the form of the detection subject. When a vein image is obtained from a palm image, the target image 8 having a form showing the outline of an open palm is used to improve the precision of a detected image of the palm.

The image authenticating apparatus 2 includes a camera unit 12, a light-emitting unit 14, an image processing unit 16, and an image display unit 18.

The camera unit 12 has an optical system 20 which focuses reflected near-infrared rays from the photographed subject 4, the near-infrared rays having been applied to the subject 4, into an image, and an image-capturing element 22 which is an infrared sensor that obtains the detected image 6. While the camera unit 12 is installed in the image authenticating apparatus 2, the camera unit 12 may be replaced with a camera function unit or incorporated as a unit independent of the camera function unit in an application to an electronic device having a camera function, such as a cellular phone and digital still camera. The optical system 20 has a lens 24 which converges light from the photographed subject 4, and a lens moving mechanism 26 which moves the lens 24 to change its position. The lens moving mechanism 26 adjusts the distance of the lens 24 to the photographed subject 4 to create an image of the photographed subject 4 on an image-capturing face of the image-capturing element 22. The image-capturing element 22 is composed of the infrared sensor, etc., that converts an infrared image into an electric signal, and puts out data of the position and focusing state of an image in the form of different levels of image signals. This signal processing for the image signals enables obtainment of the above vein image from the detected image 6.

The light-emitting unit 14 serves as a near-infrared ray source, and is composed of, for example, a near-infrared light-emitting element 28 and a strobe driver 30 working as a light-emitting driver for the light-emitting element 28. The light-emitting unit 14 operates in response to image capturing timing, causing the strobe driver 30 to supply driving power to the light-emitting element 28, thus causing the light-emitting element 28 to emit near-infrared rays for a given time to take for image-capturing.

The image processing unit 16 serves as a controlling unit for various functional units, executing such operation as obtaining the detected image 6, and controlling the lens 24 of the camera unit 12 to locate the lens 24 at a given focusing position relative to the subject 4 upon obtaining the detected image 6. The image processing unit 16 has an A/D (Analog to Digital) conversion unit 32, which functions as a signal converting unit, a digital signal processor (DSP) 34, a memory unit 36 which stores various pieces of information of a recorded image, detected image, etc., and various programs including an image authenticating program, and a host CPU (Central Processing Unit) 38. The A/D conversion unit 32 converts an image signal (analog signal) obtained at the image-capturing element 22 into a digital signal so that the digitized image signal can be processed at the DSP 34.

The DSP 34 includes an image processing LSI (Large-Scale Integration), takes in the detected image 6 from the image-capturing element 22, and executes processes of controlling display of the detected image 6, of displaying the target image 8, etc.

The memory unit 36 is composed of a nonvolatile memory element, such as flash memory, and has a program memory area 40, an image memory area 42, and a work memory area 44, as shown in FIG. 2. The image authenticating program, etc., are stored in the program memory area 40, and recorded images, which constitute authentication information, are stored in the image memory area 42.

The host CPU 38 executes the image authenticating program, etc., stored in the program memory area 40 of the memory unit 36 to communicate with the DSP 34 and control the strobe driver 30. An operational input unit 46 sends operational input to the CPU 38, and includes a shutter button 48 and a mode selection button 50. In other words, the host CPU 38 receives input of a photographing command from the shutter button 48 and/or a mode selection command for selecting a general photographing mode or an image authentication mode from the mode selection button 50 as a momentum element for executing control. Thus, the host CPU 38 and the DSP 34 execute processes of focusing, image capturing, light emission, displaying the target image 8, displaying the detected image 6, taking in an image, image authentication, and other kinds.

The image display unit 18 is an image display device composed of an LCD (Liquid Crystal Display), etc., and displays such as the detected image 6, the target image 8, and messages. In displaying the detected image 6, the image display unit 18 also displays a transition in the focus of the image.

The DSP 34 will then be described with reference to FIG. 3. FIG. 3 depicts a structural example of the DSP 34.

The DSP 34 executes various processes of focusing, image capturing, etc., as described above. An image signal digitized at the A/D conversion unit 32 is put into the DSP 34, from which the signal is further sent through a sensor interface (IF) 52, an image processing unit 54, and a function controlling unit 56 to a contrast detecting unit 58, and to RAM (Random Access Memory) 60. The sensor IF 52 is an input unit that receives an image signal from the A/D conversion unit 32, and serves as a buffer for an image signal to be sent to the image processing unit 54. The function controlling unit 56 is composed of a bus, and is connected to the host CPU 38 via a CPU interface (IF) 55.

The contrast detecting unit 58 detects the contrast of an image, putting out a contrast detection signal to an autofocus unit 62. The autofocus unit 62 forms an autofocus (AF) control signal based on the level of the detection signal, and puts out the AF control signal to a lens moving mechanism 26. Through the above signal processes, the detected image 6 captured by the image capturing element 22 is taken into the DSP 34 as control information, and the lens 24 of the camera unit 12 is controlled to be located at the given focus matching position relative to the photographed subject 4 upon capturing the detected image 6. Through this autofocus operation, the detected image 6 created on the image-capturing element 22 is sequentially taken into the DSP 34, and then is stored in the RAM 60 and displayed on the image display unit 18 as well.

The DSP 34 includes a target image generating unit 64, which puts out the target image 8 through the function controlling unit 56 and a digital interface (IF) unit 66 to the image display unit 18 upon responding to a momentum element of the start of the image authentication mode. The target image 8 is displayed in such a manner that the detected image 6 is superposed on the target image 8. The detected image 6 taken into the DSP 34 is put out from a digital IF 67 to the memory unit 36, which takes in the detected image 6 as a recorded image at the initial stage of operation.

The DSP 34 further includes a zooming unit 68, a resizer 70, a rotator 72, and a sharpener 74, which are connected to the function controlling unit 56. The zooming unit 68 executes a process of magnifying/demagnifying a taken image. The resizer 70 executes a process of changing the size of an image, changing, for example, a taken image having a million pixels into an image having a hundred of thousands of pixels. The rotator 72 executes a process of rotating an image, and the sharpener 74 executes such a process as highlighting the outline of an image.

Figure 4:
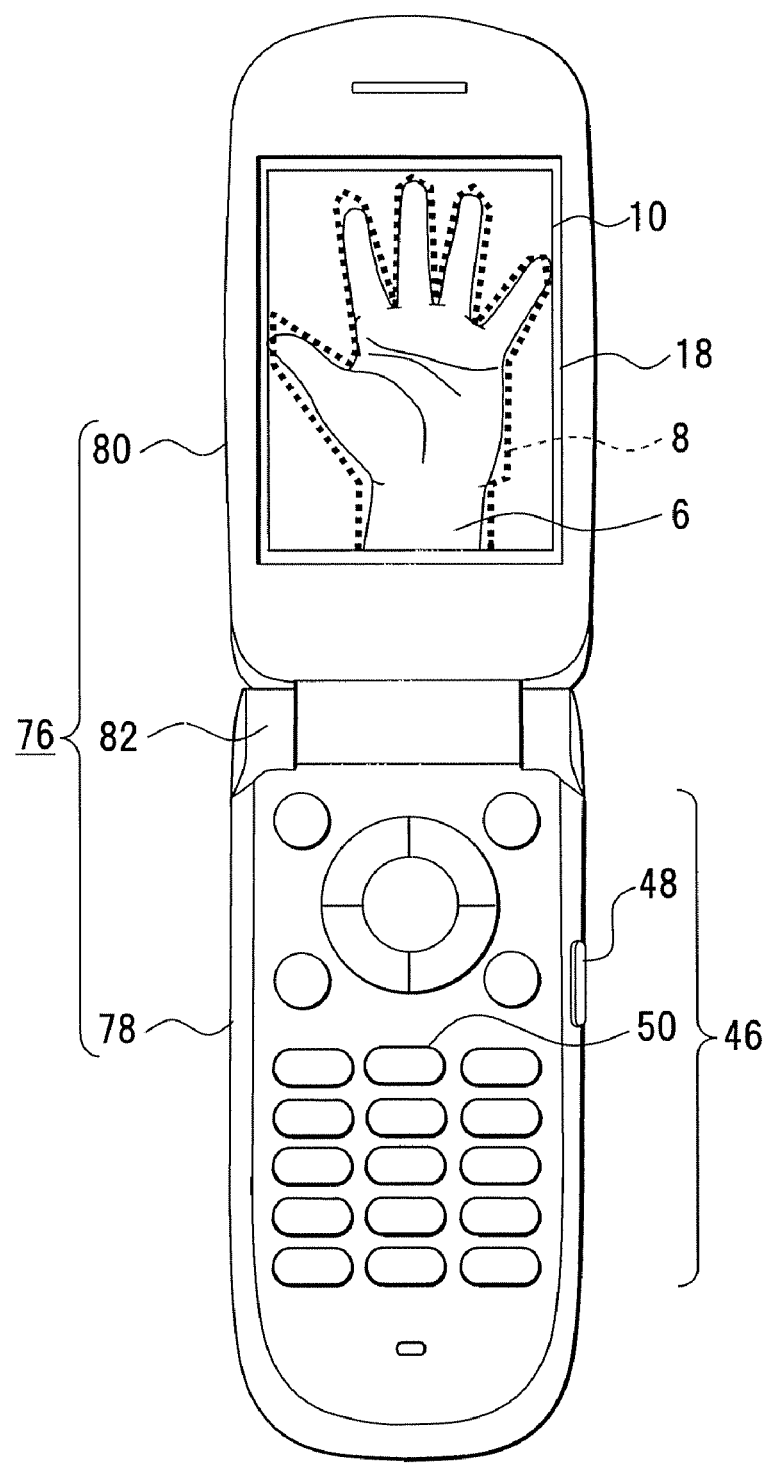
FIG. 4 depicts a cellular phone that is opened.
Figure 5:
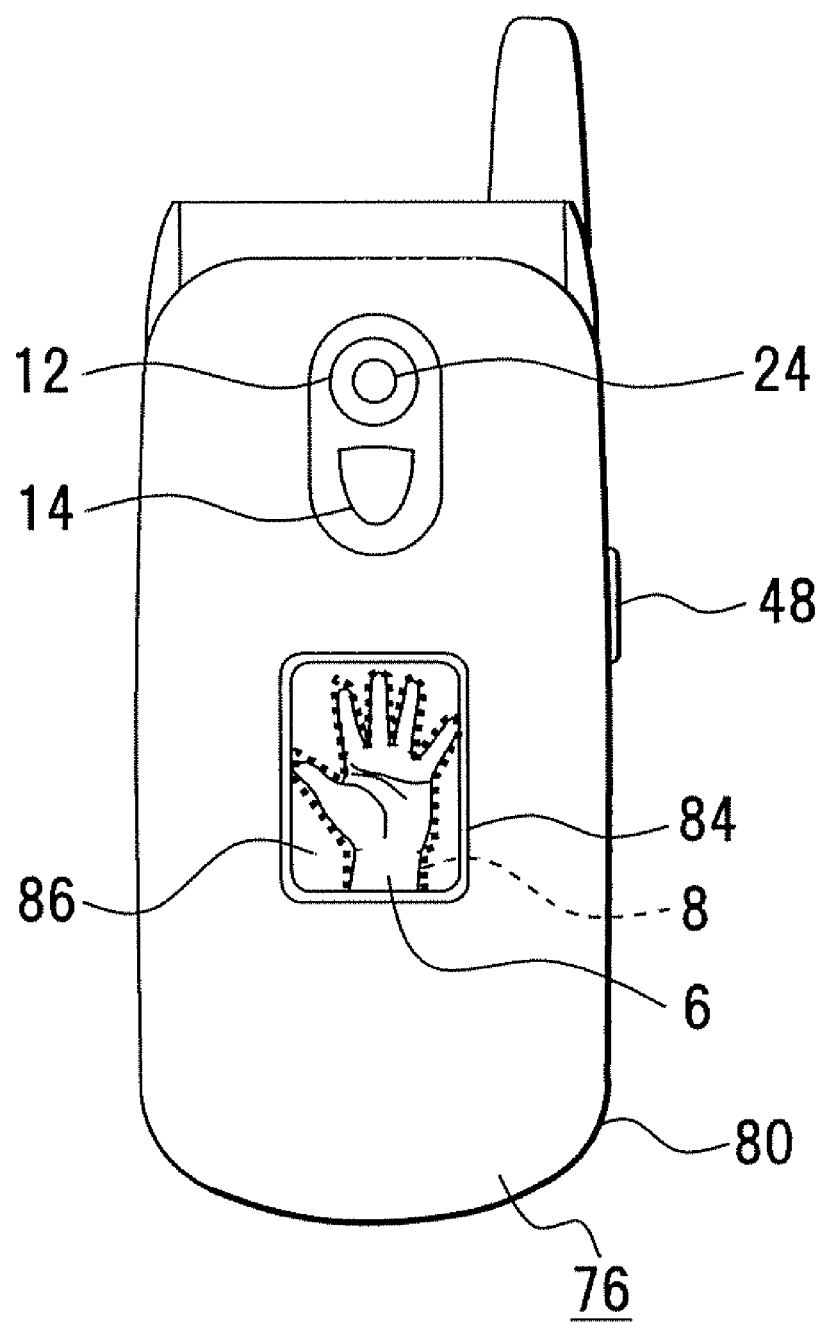
FIG. 5 depicts the cellular phone that is closed.

A cellular phone equipped with the image authenticating apparatus 2 will then be described with reference to FIGS. 4, 5. FIGS. 4, 5 are structural examples of a cellular phone equipped with the image authenticating apparatus 2, where FIG. 4 depicts the cellular phone that is opened, and FIG. 5 depicts the cellular phone that is closed.

The cellular phone 76, as shown in FIG. 4, includes cases 78, 80 which can be opened apart and closed together via a hinge 82. The case 78 includes an operational input unit 46 having a shutter button 48, a mode selection button 50, a cursor key, dial buttons, etc. The case 80 has the image display unit 18 serving as a first display unit.

The back face of the case 80, as shown in FIG. 5, has the camera unit 12 for general photographing and image authentication, the light-emitting unit 14, and an image display unit 84 serving as a second display unit.

When photographing is carried out using the cellular phone 76 with the cases 78, 80 closed, the closure of the cases 78, 80 is detected with a switch, and image output from the DSP 34 is put into display on the image display unit 84 on the basis of detection output from the switch. The image display unit 84, like the image display unit 18, displays the detected image 6 and the target image 8 simultaneously on a screen 86.

Figure 6:
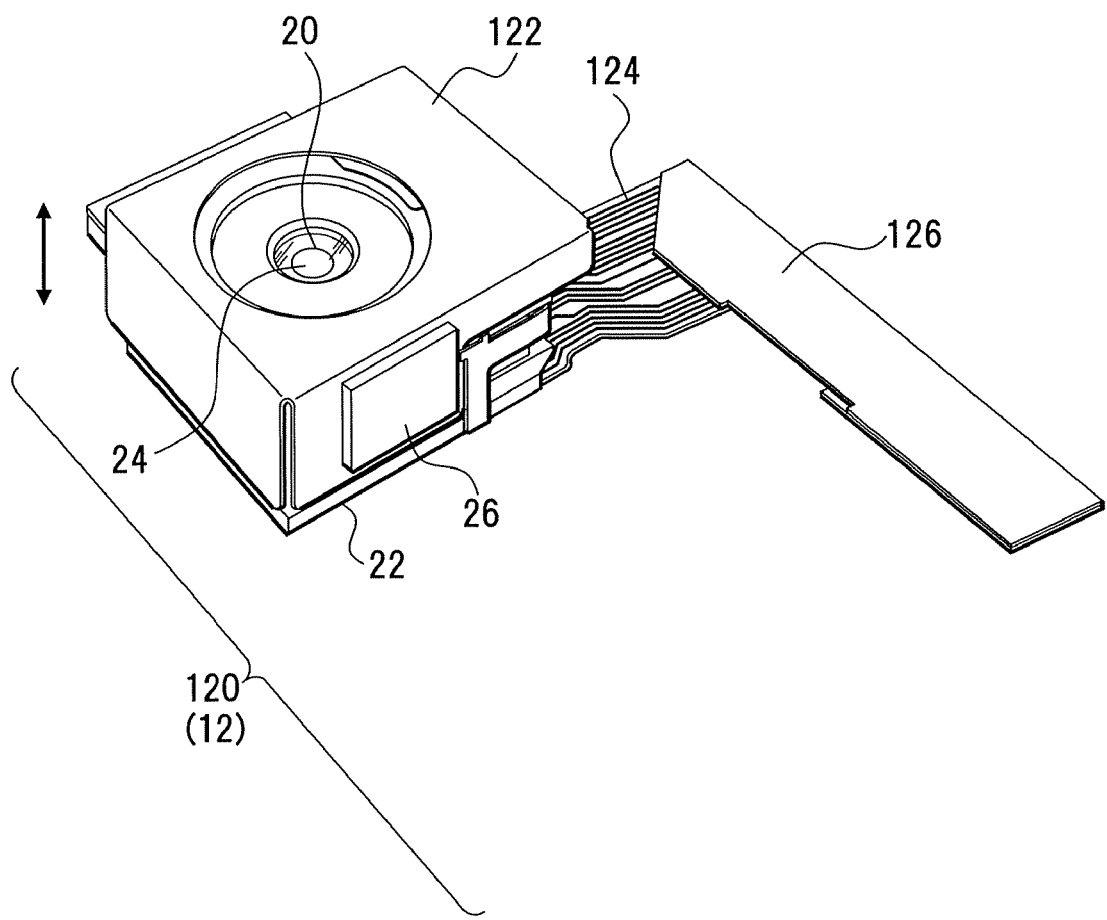
FIG. 6 depicts an example of a camera unit.

A structural example of the camera unit 12 will then be described with reference to FIG. 6. FIG. 6 depicts a camera unit. In FIG. 6, the same components as shown in FIG. 1 are denoted by the same reference numerals.

The camera unit 120, which is a structural example of the camera unit 12, includes the optical system 20 at the center of a parallelepipedic case 122, the lens moving mechanism 26 for moving back and forth the lens 24 of the optical system 20, and the image-capturing element 22 at the back face side to the optical system 20. A bus 124 is connected to the image-capturing element 22, and a connector 126 is connected to the bus 124. To the connector 126, the A/D converting unit 32 of the image processing unit 16 is connected.

Figure 7:
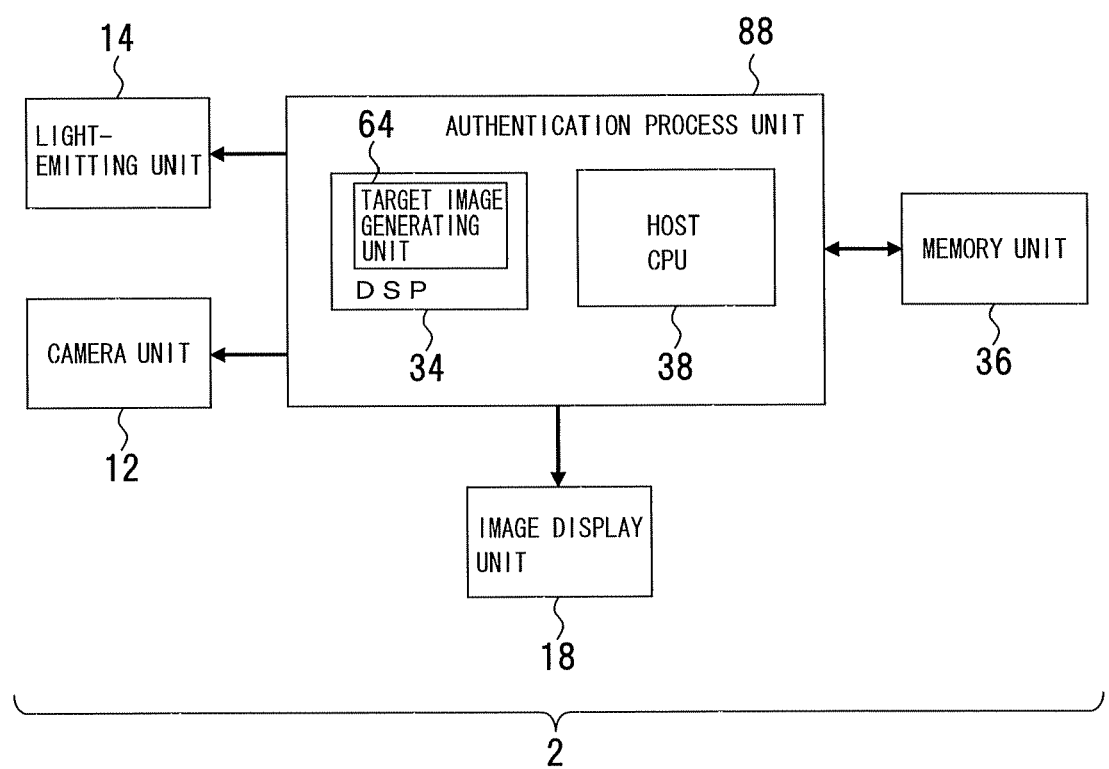
FIG. 7 depicts an image authenticating process for the image authenticating apparatus.

An image authenticating method will then be described with reference to FIG. 7. FIG. 7 depicts an image authentication process for the image authenticating apparatus. In FIG. 7, the same components as shown in FIG. 1 are denoted by the same reference numerals.

The image authenticating apparatus 2 includes an authentication process unit 88 which executes an authentication process program, etc. The authentication process unit 88 serves as a functional unit that executes an authentication process, and has the DSP 34 of the image processing unit 16, and the host CPU 38, etc. The authentication process unit 88 is linked to the camera unit 12, to the light-emitting unit 14, to the image displaying unit 18, to the memory unit 36, and to the target image generating unit 64.

According to the above structure, the image authenticating method or the image authenticating program for the image authenticating apparatus 2 includes the image authentication process consisting of the following processes of:

a. focusing and image capturing;
b. light emission;
c. displaying the target image 8;
d. displaying the detected image 6;
e. taking in an image;
f. image authentication; and
g. other kinds.

The reference numeral appended to each process does not represent the continuity or sequence of the processes.

(a) Focusing and Image Capturing

When the image authentication mode is selected by mode selection, the image authentication process is executed, thus the focusing and image capturing process is executed at the camera unit 12 to obtain the detected image 6. At the camera unit 12 brought into the image authentication mode, the lens moving mechanism 26 is controlled according to the detected image 6. As a result, the lens 24 of the camera unit 12 is controlled to be located at the optimum focusing position relative to the photographed subject 4 in obtaining the detected image 6. In this case, the lens 24 is set, for example, at the point 20 cm distant from the photographed subject 4. Keeping the photographed subject 4 at the recommended distance by focus control provides the clear detected image 6, which is taken into the memory unit 36.

(b) Light Emission

When the shutter button 48 is operated upon image capturing, the near-infrared light-emitting element 28 emits near-infrared rays onto the photographed subject 4. The near-infrared rays are emitted in the form of either flashing light or continuous light.

(c) Displaying Target Image 8

When the image authenticating apparatus 2 changes its mode into the image authentication mode, the target image generating unit 64 generates the target image 8 before an image is taken in. The target image 8 is displayed on the screen 10 of the image display unit 18. In this case, the target image 8 is displayed on the screen 86 of the image display unit 84 when the cases 78, 80 of the cellular phone 76 are kept closed.

(d) Displaying Detected Image 6

In the image authentication mode, the detected image 6 of the photographed subject 4 captured by the camera unit 12 is displayed on the image display unit 18. Since the detected image 6 is displayed together with the target image 8 on the screen 10, a user is allowed to know whether the detected image 6 is in a recommended position and/or recommended form indicated by the target image 8 through comparison between the detected image 6 and the target image 8. The recommended form mentioned here means such a case that the detected image 6 is matched to the target image 8 formed by the outline of an open palm when a vein image of the palm is found among recorded images.

When the cases 78, 80 of the cellular phone 76 are closed, the detected image 6 and target image 8 are displayed together on the screen 86 of the image display unit 84 to enable comparison between both images.

(e) Taking in Image

The process of taking in an image includes a preliminary process of user operation and of image capturing based on the user operation.

In the preliminary process, a user compares the detected image 6 with the target image 8, both images being displayed on the screen 10 of the image display unit 18 or on the screen 86 of the image display unit 84, and matches the detected image 6 to the target image 8. In other words, the user adjusts the relative positional relation between the cellular phone 76 and the photographed subject 4, that is, matches the detected image 6 of the palm of the photographed subject 4 to the target image 8.

After such a preliminary process, the detected image 6 matches the target image 8 on the screen 10 or the screen 86. The user responds to image matching, which is a momentum element, operating the shutter button 48 to be able to take in the detected image 6. The user may press the shutter button 48 half-way down to bring the detected image 6 to a standstill, and then take in the still detected image 6.

(f) Image Authentication

In the image authentication process, the taken detected image 6 is authenticated by comparing it with a recorded image stored in the memory unit 36 to determine on whether the detected image 6 represents an authentic person or another person on the basis of matching or mismatching of the detected image 6 to the recorded image. Based on a result of this authentication, a determination on authenticity is put out.

(g) Other Kinds of Processes

A recorded image compared with the detected image 6 is authentication information used for determination on the authentic person. In the case of the cellular phone 76, an image for authenticating a user of the cellular phone 76 is recorded in the phone. This recorded image is the detected image 6 given as initial information to the cellular phone 76. This detected image 6, therefore, is stored in the memory unit 36 as recorded information.

The target image 8 is put out in advance as an inherent value from the target image generating unit 64. The target image 8, however, may be put out in a modified form in line with the shape of the outline of the recorded image.

Figure 8:
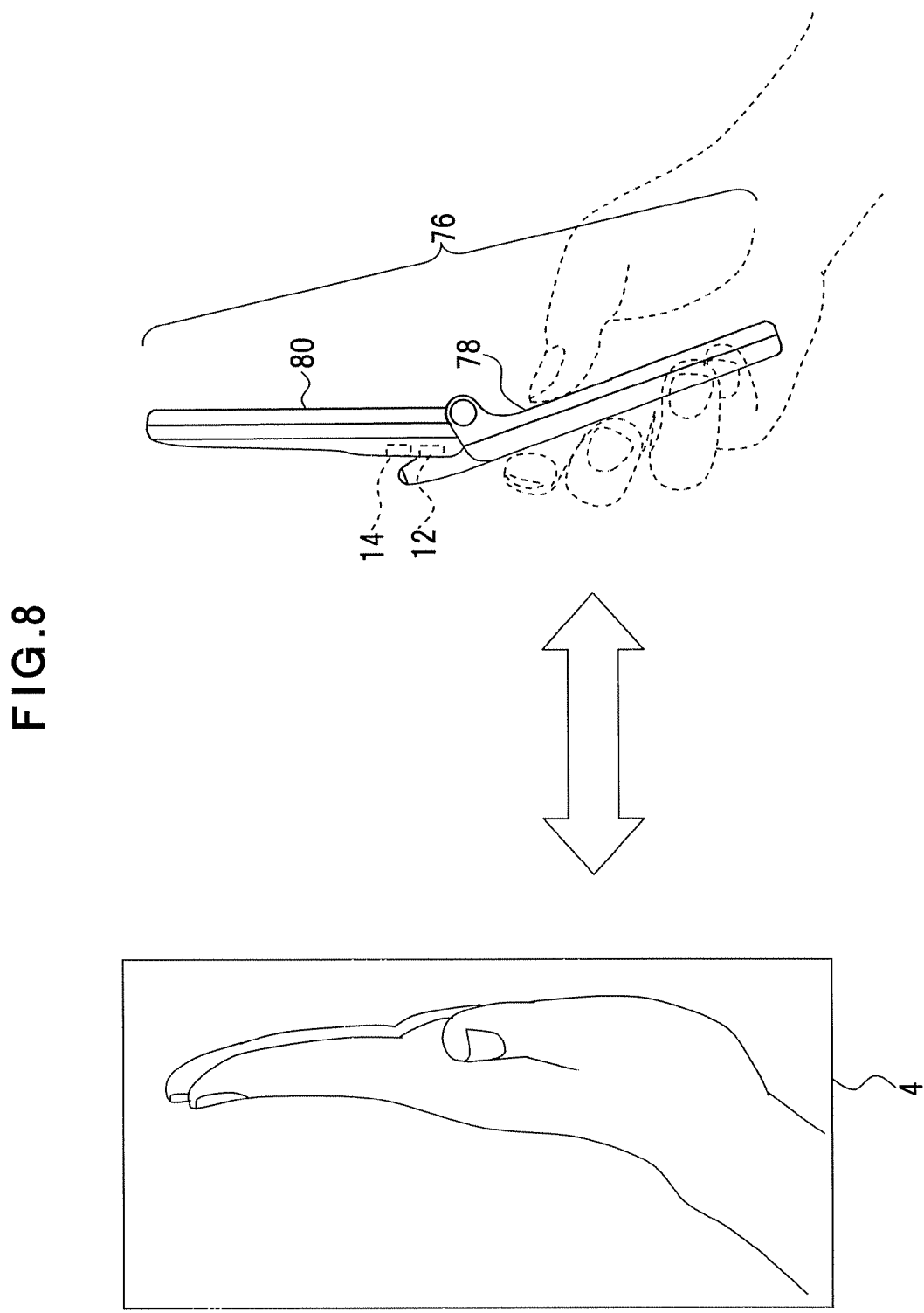
FIG. 8 depicts an image-capturing operation.

The image processing will then be described with reference to FIGS. 8, 9, 10, 11, 12. FIG. 8 depicts an image-capturing operation, FIG. 9 depicts a target image on a screen, and FIGS. 10, 11, 12 each depicts the target image and a detected image on the screen.

The operation mode of the cellular phone 76 is changed to the image authentication mode. Then, as shown in FIG. 8, the lens 24 of the camera unit 12 of the cellular phone 76 is directed to a palm, which is the photographed subject 4, to display the detected image 6 and the target image 8 on the screen 10 of the image display unit 18.

Figure 9:
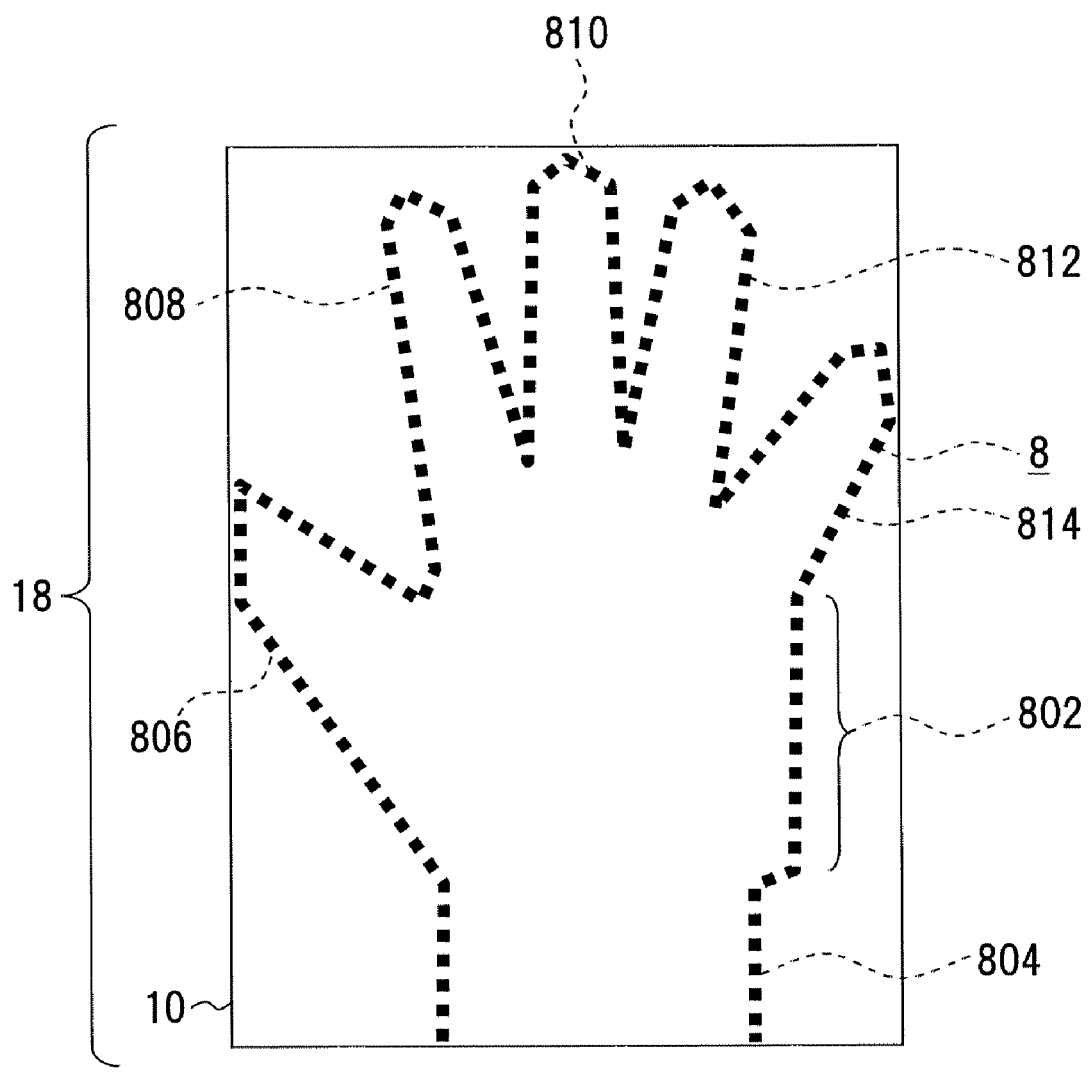
FIG. 9 depicts a target image on a screen.
Figure 10:
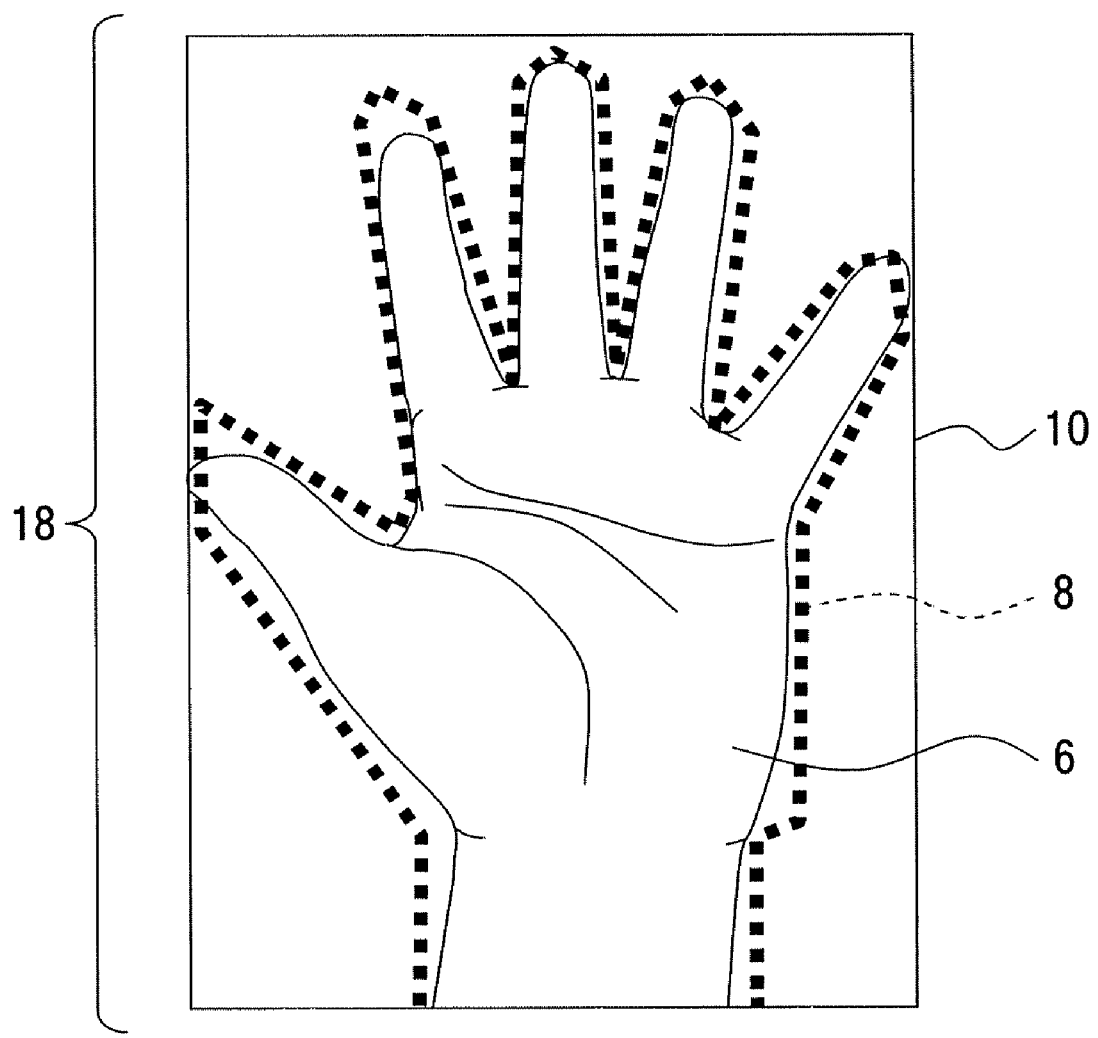
FIG. 10 depicts the target image and a detected image on the screen.

In the image authentication mode, as shown in FIG. 9, the target image 8 is displayed on the screen 10 of the image display unit 18. This target image 8 is the figure that represents the shape of the outline corresponding to that of a recorded image. The target image 8 in FIG. 9 represents the shape of an open left hand including its palm, showing the shape of the palm 802 in the center of the hand, of the wrist 804, of the thumb 806, of the forefinger 808, of the middle finger 810, of the third finger 812, and of the little finger 814. While the target image 8 is described with a broken line in FIG. 9, the target image 8 is not necessarily described only with the broken line, but may be with a continuous line or with a distinctive color that allows the recognition of the shape of the palm, etc. In the image authentication mode, the camera unit 12 is on operation to display the detected image 6 of the photographed subject 4. FIG. 10 depicts a state of display made at the recommended position where the detected image 6 matches the target image 8, thus in the optimum state to be ready for being taken in the detected image 6.

Figure 11:
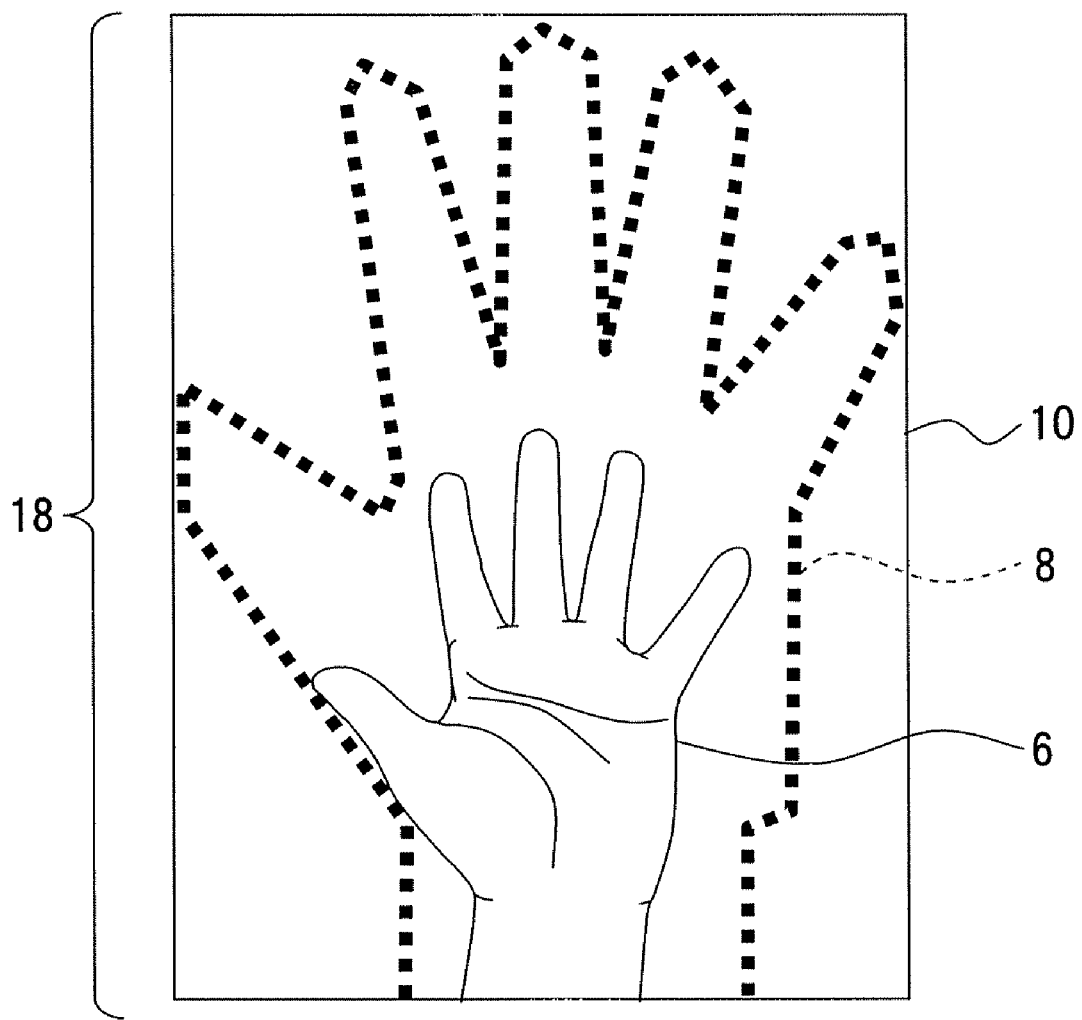
FIG. 11 depicts the target image and a detected image on the screen.

When the photographed subject 4 is too far from the camera 12, the detected image 6 is captured in a smaller size. As a result, the detected image 6 superposed on the target image 8 is displayed to be smaller than the target image 8, as shown in FIG. 11. This allows the visual recognition of the relation in size between the detected image 6 and the target image 8. Recognizing such a display, a user is prompted to adjust the distance between the photographed subject 4 and the lens 24 of the cellular phone 76 so that the outline of the detected image 6 is matched to the target image 8.

Figure 12:
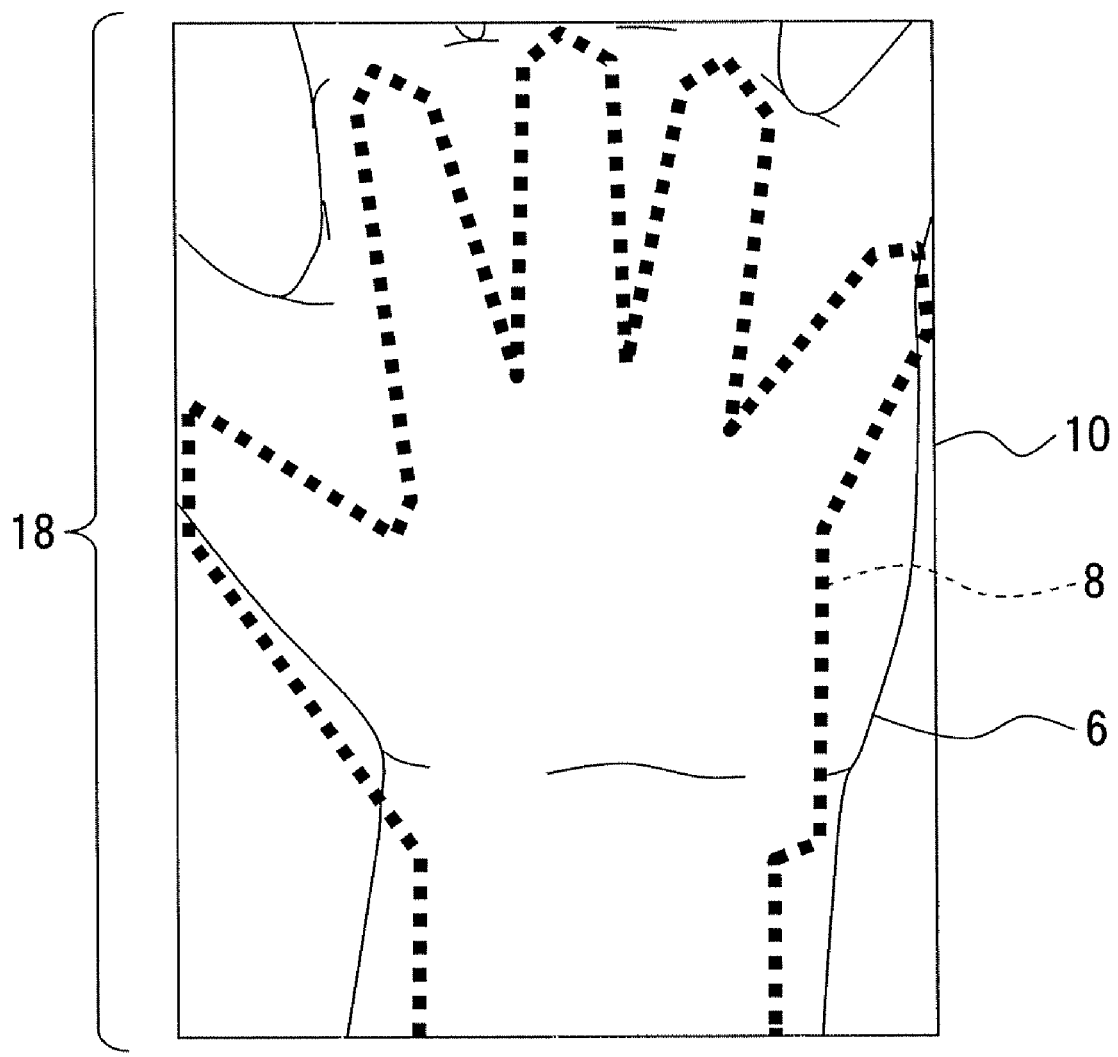
FIG. 12 depicts the target image and a detected image on the screen.

When the photographed subject 4 is too close to the camera 12, the detected image 6 is captured in a larger size. As a result, the detected image 6 superposed on the target image 8 is displayed to be so larger than the target image 8 as to project out of the screen 10, as shown in FIG. 12. As in the case of FIG. 11, this allows the visual recognition of the relation in size between the detected image 6 and the target image 8. Recognizing such a display, the user is prompted to adjust the distance between the photographed subject 4 and the lens 24 of the cellular phone 76 so that the outline of the detected image 6 is matched to the target image 8.

As a result of adjustment of the distance between the photographed subject 4 and the lens 24 for matching of the outline of the detected image 6 to the target image 8, the detected image 6 can be matched to the target image 8, as shown in FIG. 10. This detected image 6 matching the target image 8 is taken into the cellular phone 76, which is followed by a comparison between the detected image 6 and a recorded image. According to the present embodiment, the comparison between the detected image 6 and the recorded image is carried out as a comparison between a vein image given by the detected image 6 and that given by the recorded image.

Figure 13:
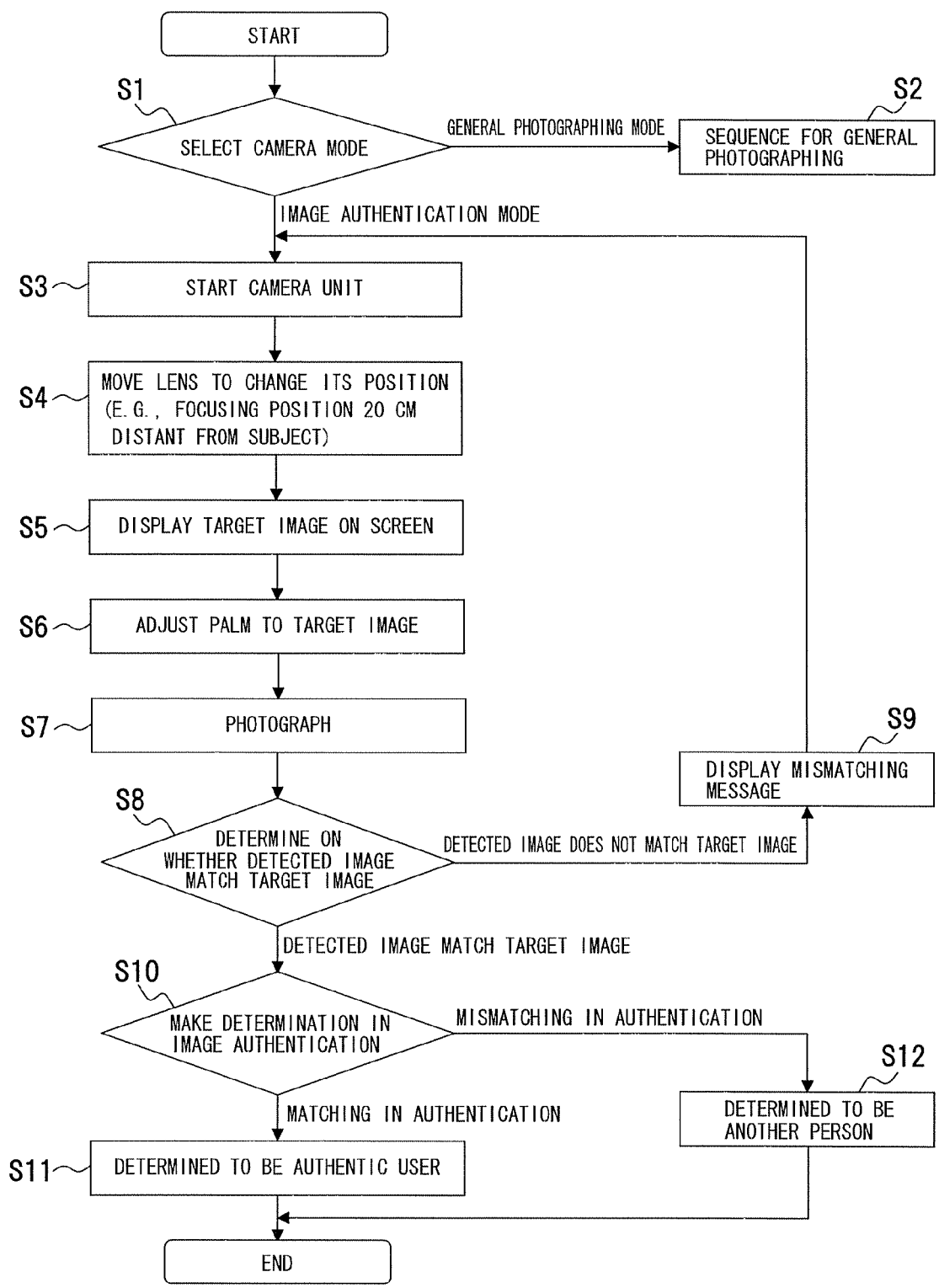
FIG. 13 is a flowchart of a process procedure for image authentication.

The image authentication process will then be described with reference to FIG. 13. FIG. 13 is a flowchart of a process procedure for image authentication.

The cellular phone 76 is put into operation, and a camera mode is selected from an initial menu (step S1). From the selected camera mode, either general photographing mode or image authentication mode is selected. When the general photographing mode is selected, the process procedure proceeds to an operational sequence for general photographing (step S2).

When the image authentication mode is selected, the camera unit 12 is started to operate (step S3), and the lens 24 is moved to change its position (step S4). The lens 24 is located at a focusing position that is separated from the photographed subject 4 by a given distance of, for example, 20 cm.

At the focusing position, the target image 8 is displayed on the screen 10 of the image display unit 18 (step S5). The detected image 6 of a palm is then superposed on the target image 8 on the screen 10. A user checks on the state of superposition of the detected image 6 and the target image 8 on the screen 10, adjusts the position of the cellular phone 76 or that of the palm to match the detected image 6 to the target image 8 (step S6), and photographs the palm that is in a properly adjusted position (step S7). Based on a result of the photographing, whether the detected image 6 matches the target image 8 is determined (step S8).

When a comparison between the detected image 6 and the target image 8 demonstrates that the outline of the detected image 6 does not match the target image 8, an mismatching message indicating mismatching of both images is displayed (step S9). The process procedure then returns to step S3, from which steps S4 to S8 are executed again.

When the detected image 6 matches the target image 8, the detected image 6 is taken into the cellular phone 76, and a determination is made in image authentication (step S10). In carrying out image authentication, a recorded image used for image authentication is read out of the memory unit 36, and the recorded image is compared with the detected image 6 to determine on whether both images match. Specifically, a stored recorded image is characteristic data of the veins of a palm, etc., and the characteristic data is compared with detection data of veins, etc., given by the detected image 6 to determine on whether both data match.

If a determination result demonstrates matching of the detected image 6 to the recorded image, a person represented by the detected image 6 is determined to be the authentic person (step S11). If the determination result proves mismatching, the represented person is determined to be another person (step S12).

As described above, with the target image 8 displayed on the screen 10, a user is allowed to adjust the positional relation between the photographed subject 4 and the cellular phone 76 to obtain the detected image 6 matching the target image 8, thus able to prepare for optimum photographing for image authentication before operating the shutter button 48 (before taking in the image).

According to the cellular phone 76, matching or mismatching of the outline of the detected image 6 to the target image 8 is determined after photographing, and the detected image 6 is taken into the cellular phone 76 again according to a determination result. This allows a user to obtain the detected image 6 matching the outline of a recorded image, thus improves the precision of image detection.

Comparing such a detected image 6 with a recorded image improves the precision of a determination on authenticity in image authentication using characteristic data of veins, etc., as authentication information. This eliminates such a trouble that additional operation of re-photographing, etc., is required after the completion of image authentication to take a longer time in an authentication process. The authentication process, therefore, is speeded up.

Figure 14:
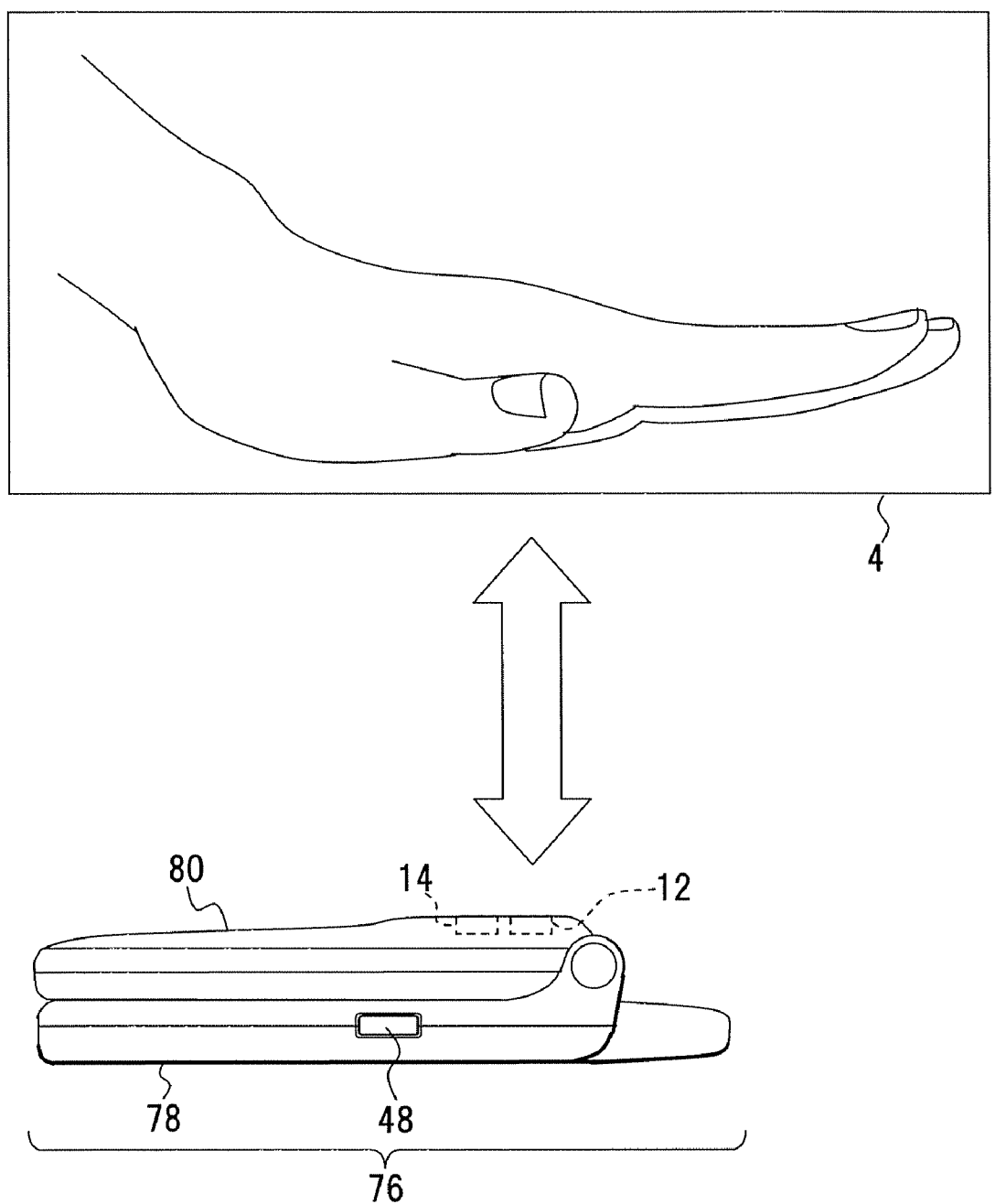
FIG. 14 depicts an operation of taking in a detected image.

In the above process procedure, the detected image 6 is taken in with the cases 78, 80 of the cellular phone 76 being kept open. The same image authentication, however, can be carried out by taking in the detected image 6 with the cellular phone 76 being kept shut, as shown in FIG. 14.

Advantages of the first embodiment mentioned heretofore are enumerated as follows.

(1) The lens 24 of the camera unit 12 is controlled to be located at a given focusing position relative to the photographed subject 4 upon obtaining the detected image 6. This means that in the start of the image authentication mode the lens 24 can be moved to an optimum position for authentication (e.g., focusing position 20 cm distant from the subject) to maintain the quality of the detected image 6.

(2) At the start of the image authentication mode, the target image 8 for the photographed subject 4 is displayed on the screen 10 of the image display unit 18. A user moves his or her palm to match it to the target image 8 on the screen 10, and the detected image 6 is obtained at a point where the palm matches the target image 8. This means that the detected image 6 optimum for authentication is obtained through focusing control described in (1) and image position control for matching the palm to the target image 8. As a result, authentication operation can be carried out more quickly.

(3) The target image 8 on the screen 10 points out fingers and even their position. This improves precision in capturing the detected image 6.

(4) The above authentication process and authenticating apparatus do not require an additional component and/or a positioning jig.

(5) Image authentication on a palm, etc., using a portable device, such as cellular phone 76, becomes possible with an additional advantage of improved authentication precision.

(6) Image authentication on a palm, etc., can be carried out only by operating the camera unit of the image authenticating apparatus 2 incorporated into the cellular phone 76. Because of this, if a permission for operating such a portable device as cellular phone 76 or for extracting stored information from the device is granted on a preset condition of satisfactory image authentication, personal information security in using such a portable device can be improved.

Second Embodiment

Figure 15:
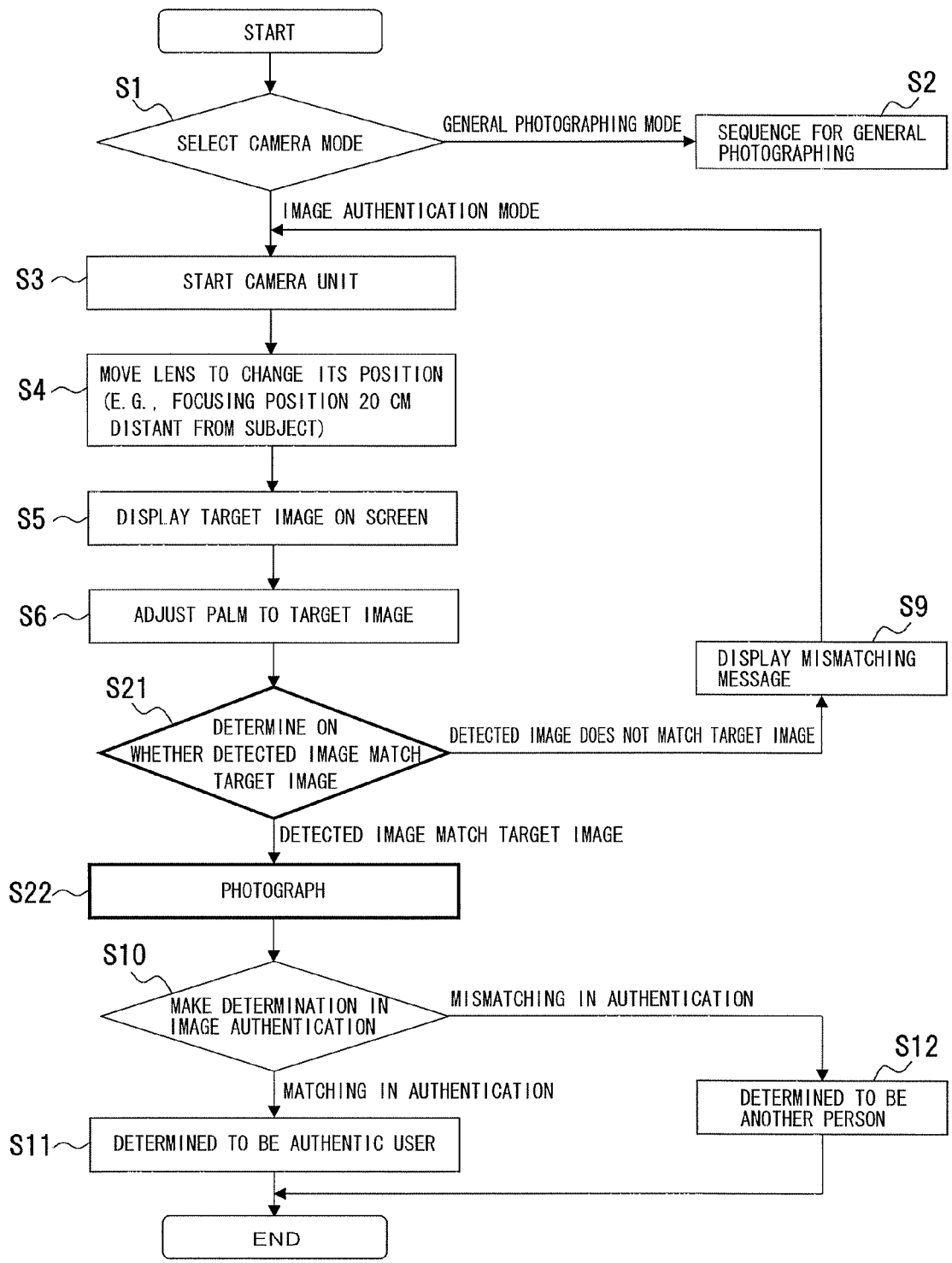
FIG. 15 is a flowchart of a process procedure for taking in an image according to a second embodiment.

A second embodiment of the present invention will be described with reference to FIG. 15. FIG. 15 is a flowchart of a process procedure for taking in an image for image authentication. In FIG. 15, the same components as shown in FIG. 13 are denoted by the same reference numerals.

The same structure described in the first embodiment as shown in FIGS. 1 to 14 is employed in the second embodiment.

According to the process procedure for the second embodiment, determination on matching of the detected image 6 to the target image 8 is made (step S21) after steps S1 to S6 are over. When the detected image 6 matches the target image 8, photographing is carried out at the timing of matching (step S22), and image authentication is carried out using the detected image 6 given by the photographing. Other steps are the same as those according to the first embodiment.

Photographing at the timing of matching of the detected image 6 to the target image 8 enables a user to avoid missing a photo opportunity, thus speeds up photographing and facilitates taking in of the detected image 6.

Third Embodiment

Figure 16:
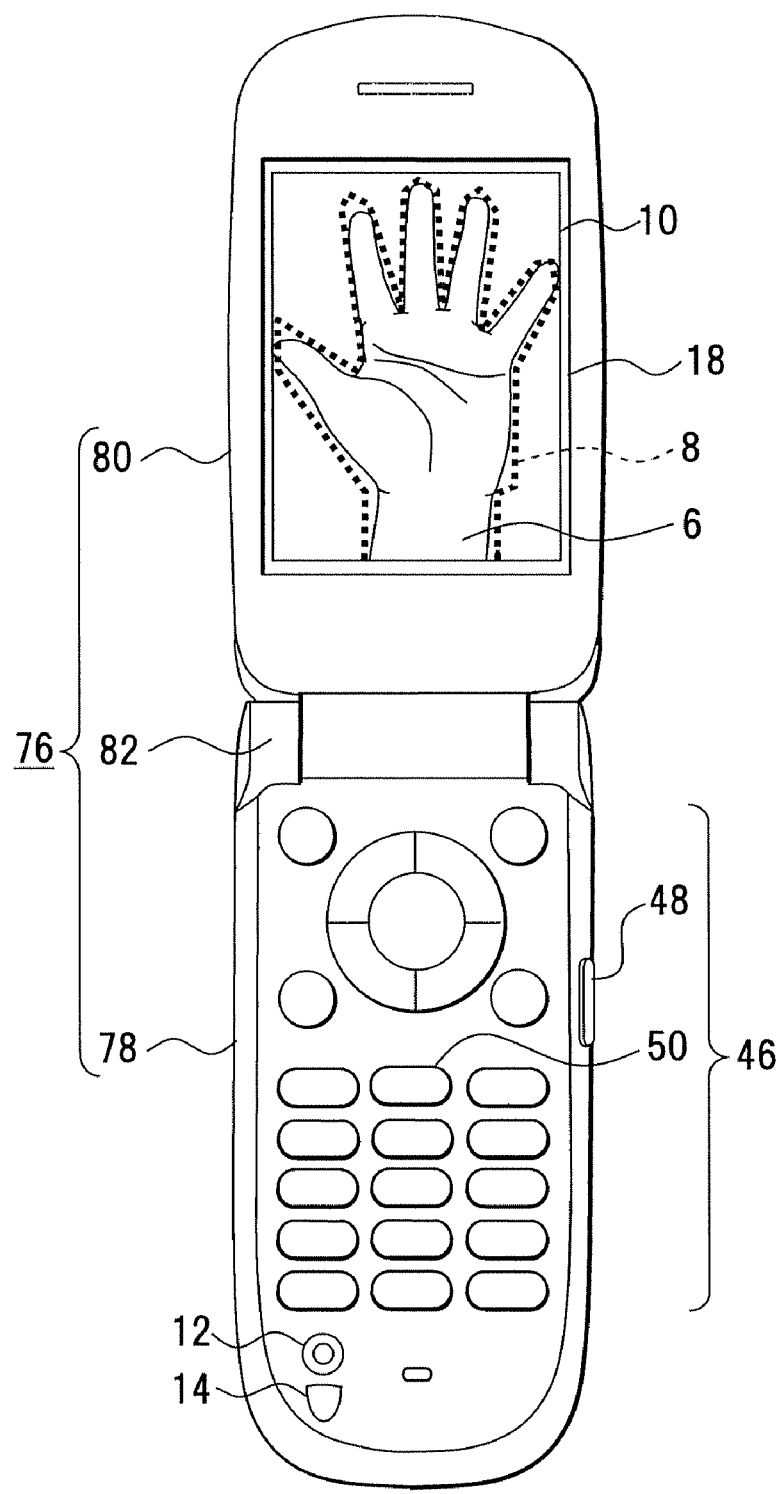
FIG. 16 depicts a cellular phone equipped with a image authenticating apparatus according to a third embodiment.
Figure 17:
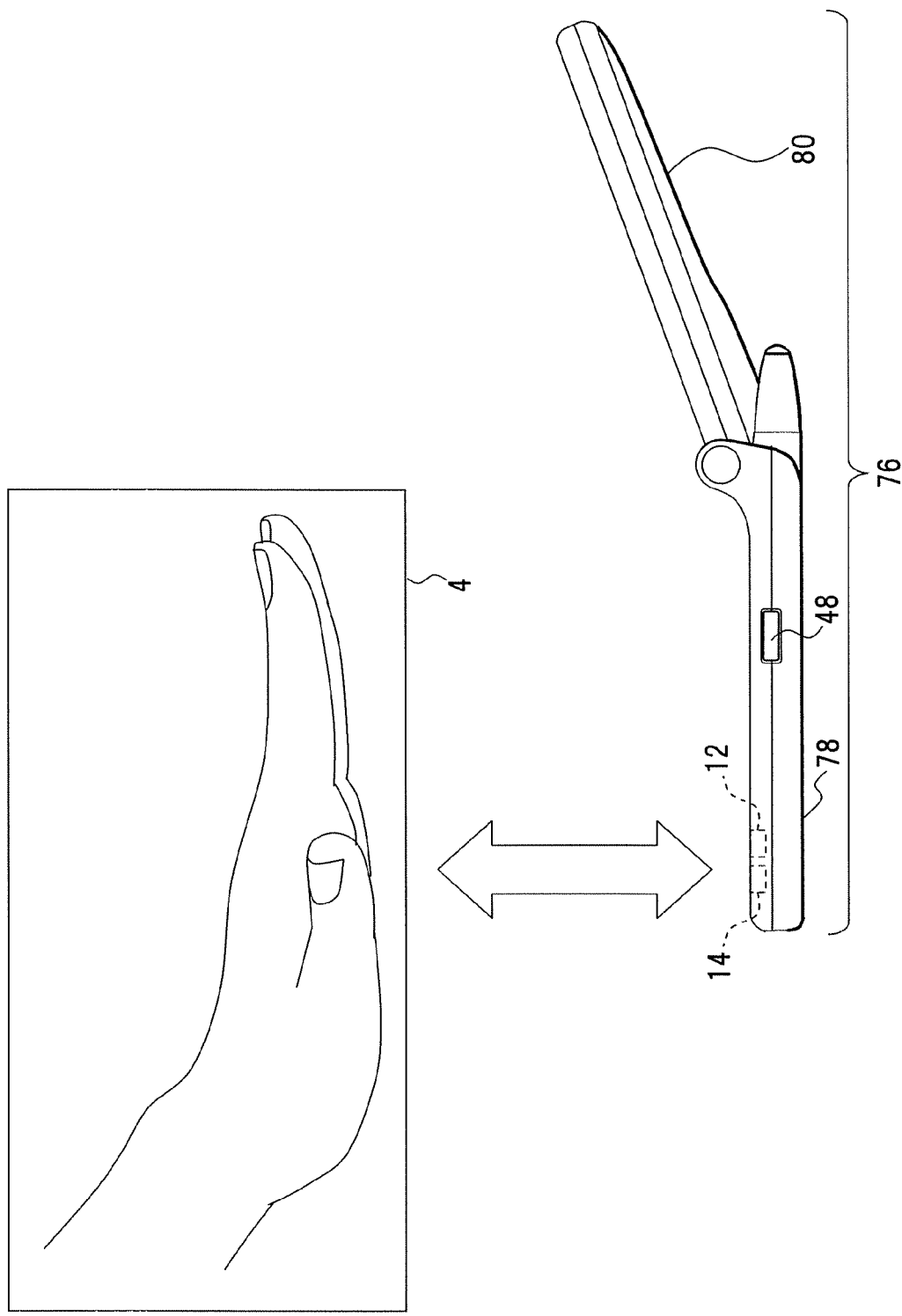
FIG. 17 depicts the cellular phone and an operation of taking in a detected image.

A third embodiment of the present embodiment will be described with reference to FIGS. 16, 17. FIG. 16 depicts a cellular phone equipped with an image authenticating apparatus, and FIG. 17 depicts the cellular phone equipped with the image authenticating apparatus, and an operation of taking in a detected image. In FIGS. 16, 17, the same components as shown in FIGS. 1, 4, 8 are denoted by the same reference numerals.

According to the third embodiment, as shown in FIG. 16, the camera unit 12 and the light-emitting unit 14, which are dedicated to image authentication, are installed in the case 78 of the cellular phone 76. As shown in FIG. 17, this cellular phone 76 allows such an operation that the case 78 is placed still on a table, etc., and the photographed subject 4 is directed to the camera unit 12 on the case 78, then the detected image 6 is matched to the target image 8 to be taken in.

Fourth Embodiment

Figure 18:
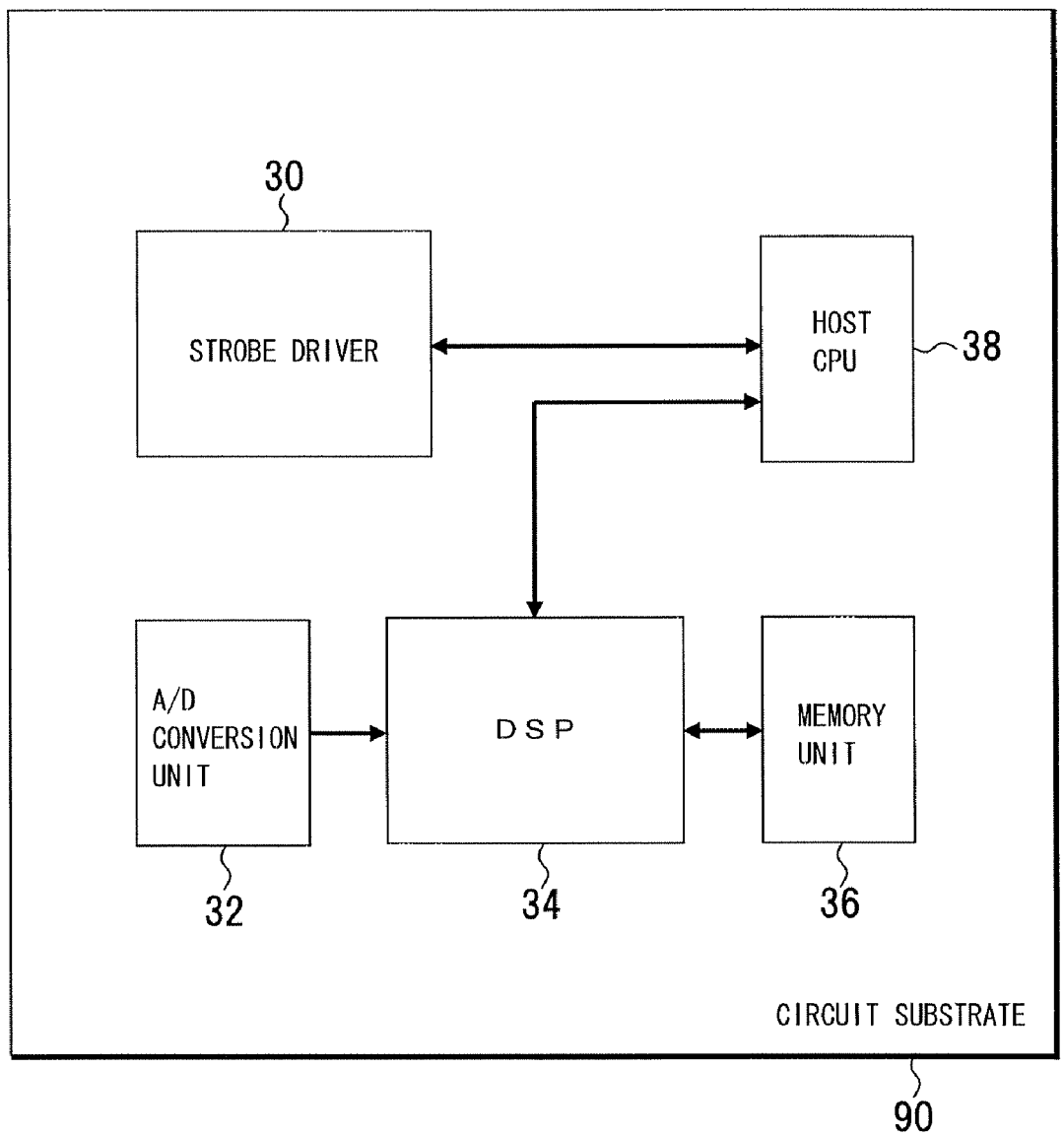
FIG. 18 depicts a circuit substrate for an image authenticating apparatus according to a fourth embodiment.

A fourth embodiment of the present invention will be described with reference to FIG. 18. FIG. 18 depicts a circuit substrate used for an image authenticating apparatus. In FIG. 18, the same components as shown in FIG. 1 are denoted by the same reference numerals.

The circuit substrate 90 includes the strobe driver 30, the A/D conversion unit 32, the DSP 34, the memory unit 36, and the host CPU 38. The circuit substrate 90 having such a constitution is used to compose the image authenticating apparatus 2.

While the circuit substrate 90 includes the strobe driver 30, the A/D conversion unit 32, the DSP 34, the memory unit 36, and the host CPU 38, according to the fourth embodiment, the substrate 90 may further include another functional unit shown in FIG. 1, or dispense with such a functional unit as strobe driver 30.

Figure 19:
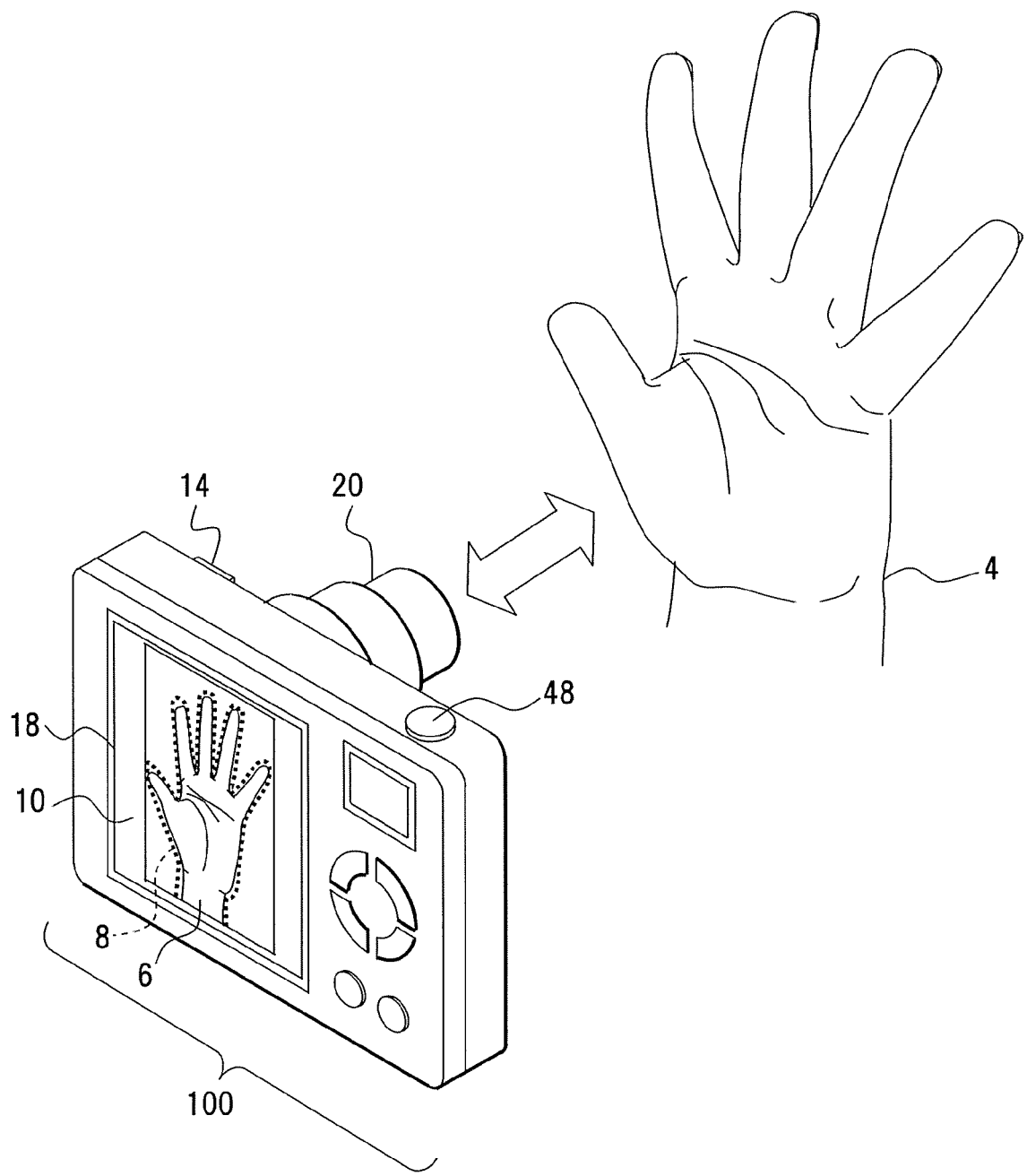
FIG. 19 depicts a digital still camera equipped with an image authenticating apparatus according to another embodiment.
Figure 20:
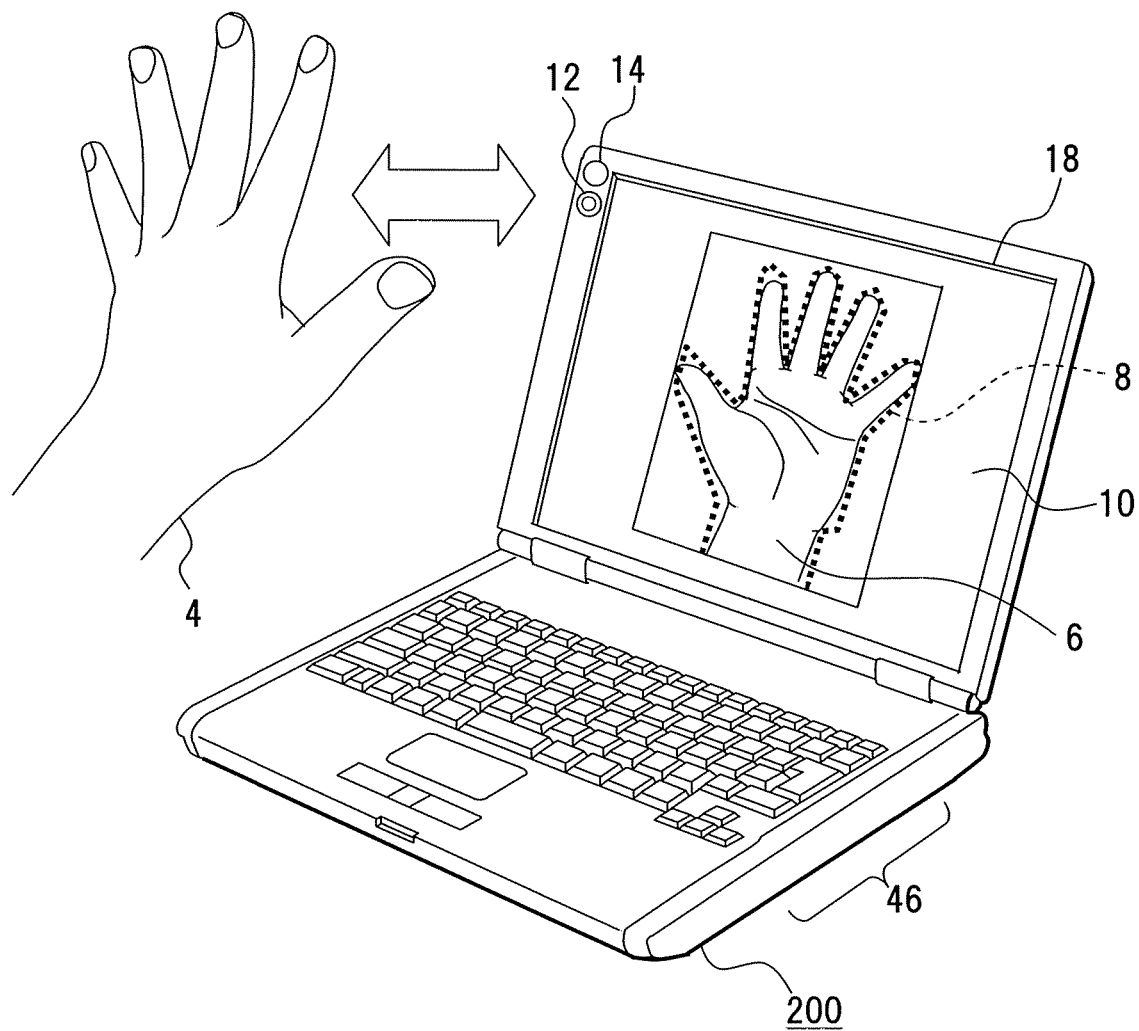
FIG. 20 depicts a PC equipped with an image authenticating apparatus according to another embodiment.
Figure 21:
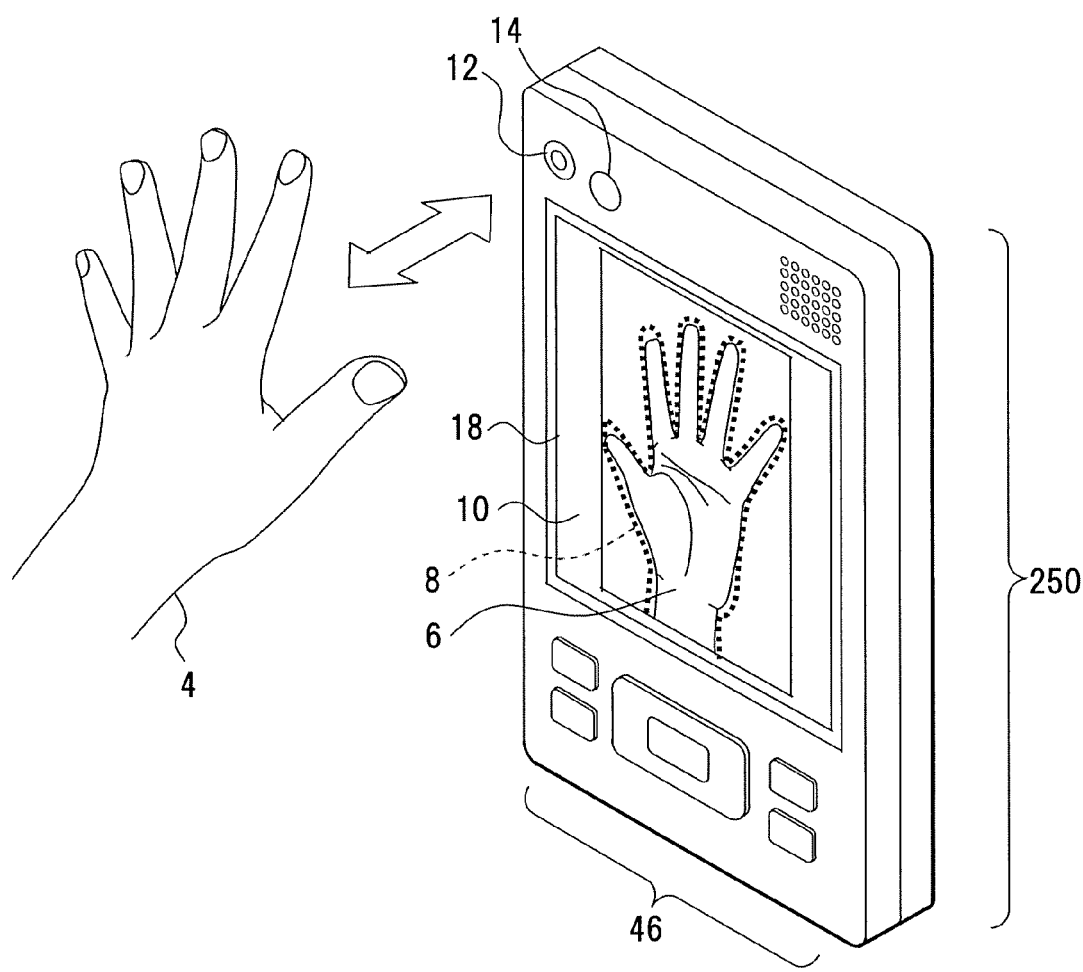
FIG. 21 depicts a PDA equipped with an image authenticating apparatus according to still another embodiment.
Figure 22:
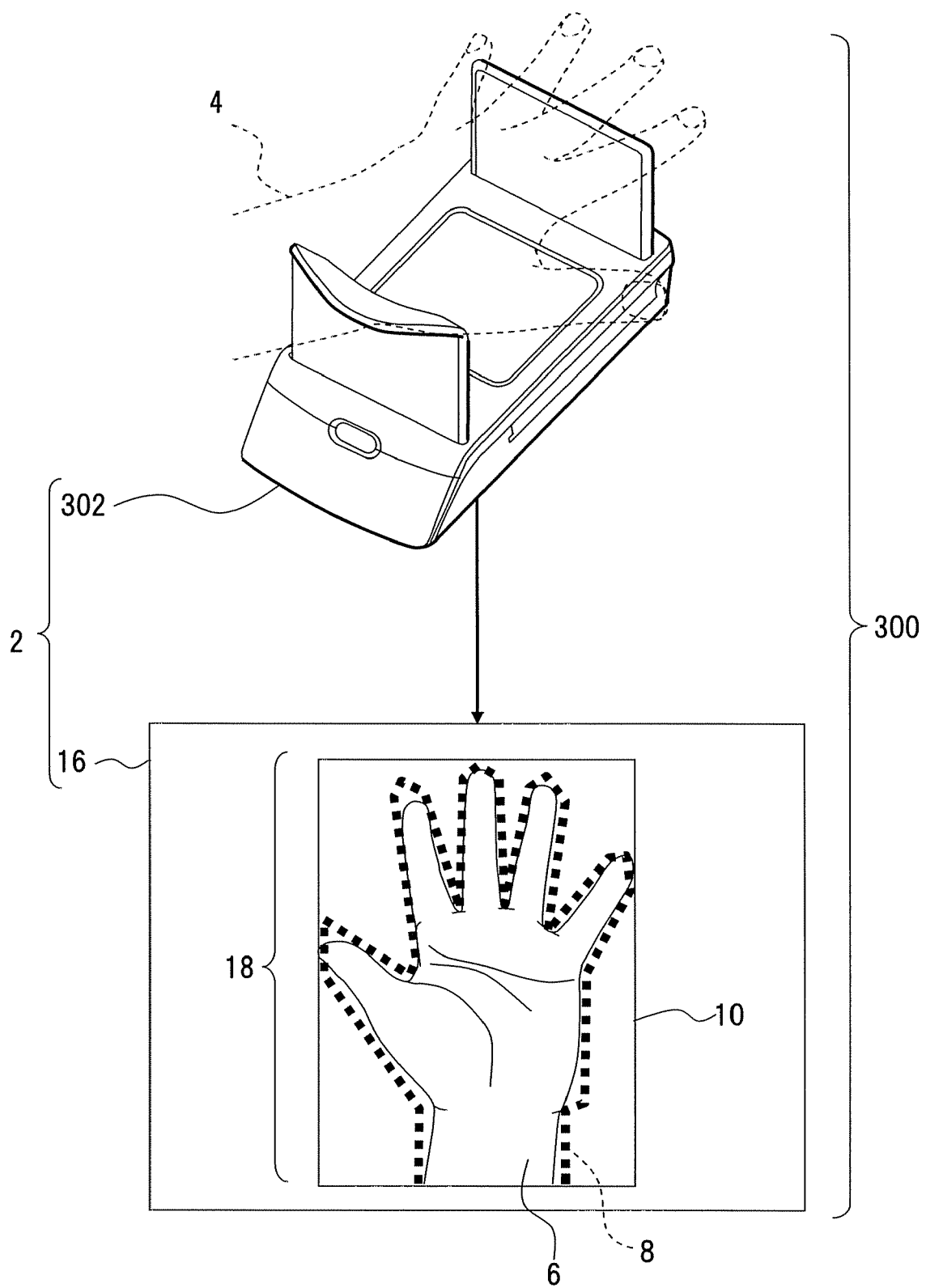
FIG. 22 depicts an ATM equipped with an image authenticating apparatus according to still another embodiment.
Figure 24:
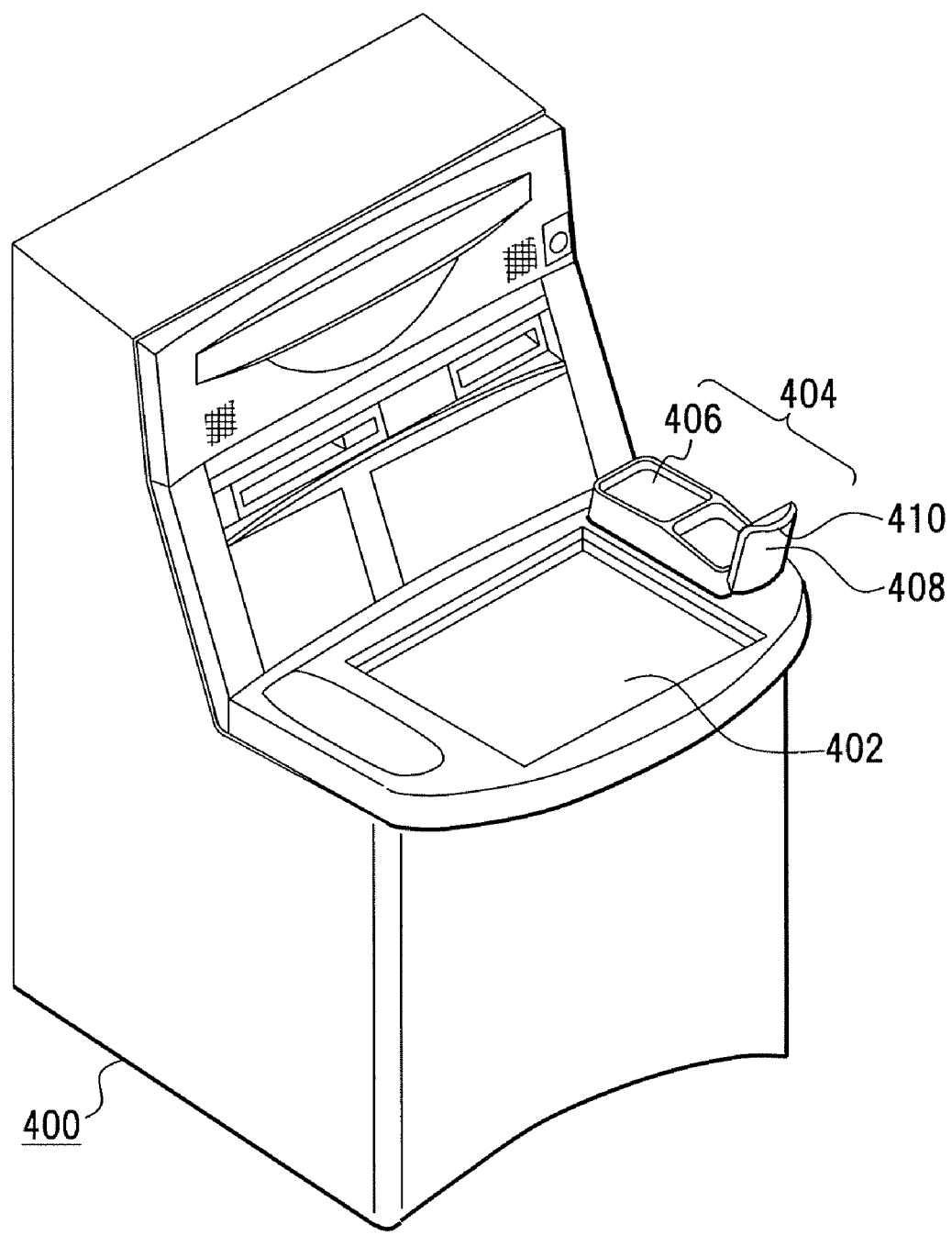
FIG. 24 depicts an example of a conventional ATM equipped with an image-capturing device.
Figure 25:
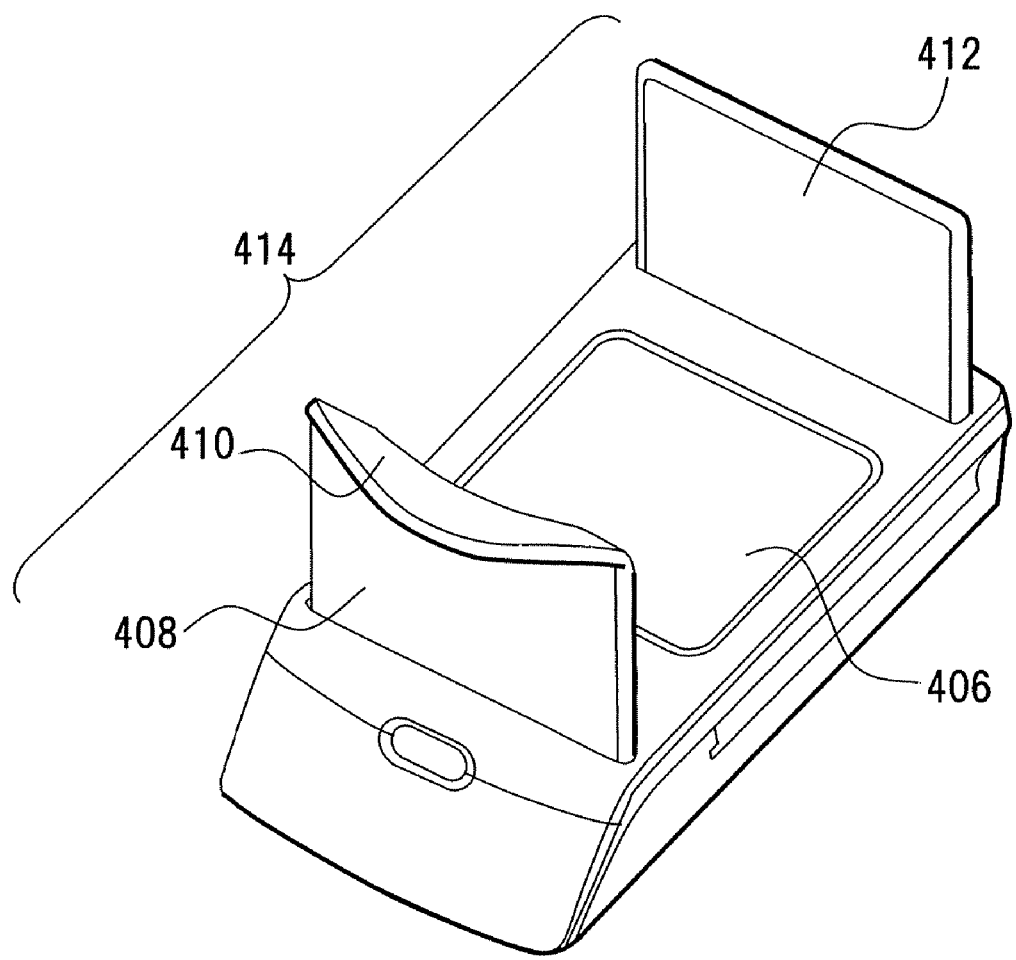
FIG. 25 depicts an example of a conventional image-capturing device installed in the ATM.

Other Embodiments (1) The cellular phone 76 equipped with the camera unit 12 is described in the first to third embodiments. The scope of the present invention, however, is not limited to the cellular phone 76. The image authenticating apparatus 2 may be incorporated into a digital still camera 100, as shown in FIG. 19, into a PC 200, as shown in FIG. 20, into a portable information terminal unit (PDA: Personal Digital Assistant) 250, as shown in FIG. 21, or into an ATM 300, as shown in FIG. 22, where the detected image 6 and target image 8 overlapping each other are displayed on the screen 10 of the image display unit 18 to determine the optimum position of the photographed subject 4. In FIGS. 19, 20, 21, 22, the same components as shown in FIGS. 1, 4 are denoted by the same reference numerals.

The ATM 300 shown in FIG. 22 has an image-capturing device 302, and displays the detected image 6, which is captured by the image-capturing device 302, on the screen 10 of the image display unit 18. This application example clearly demonstrates that the application of the present invention is not limited to portable equipment.

(2) In the above embodiments, such a control process may be carried out that a gap between the detected image 6 and the target image 8 is detected, and then the detected image 6 is matched in position to the target image 8 by controlling the lens moving mechanism 26.

(3) In the above embodiments, the image processing unit 16 is described as the controlling unit that controls the lens 24 of the image-capturing unit (camera unit 12) to locate the lens 24 at a given focusing position relative to the photographed subject 4 upon taking in the detected image 6. This control unit may be composed of the DSP 34 only.

While the preferred embodiments of the present invention have been described, the description is not intended to limit the present invention. Various modifications and revisions of the embodiments can be made by those skilled in the techniques in accordance with the points and gist of the invention that are described in the claims or disclosed in the specification. These modifications and revisions surely fall within the true scope of the present invention.

The present invention applies to image authentication carried out by detecting the features of a living body expressed in fingerprints or veins in the form of an image and comparing the detected image with a recorded image to determine on whether the detected image represents an authentic person or another person. The invention allows control of the lens of an image-capturing unit to locate the lens at a given focusing position relative to a photographed subject upon taking in the detected image, and facilitates obtainment of the detected image identical in position and/or form with the recorded image from the photographed subject. The invention improves precision in image authentication using the recording image and the detected image, and facilitates authentication operation, thus offers great practical advantages.

What is claimed is:

1. An image authenticating apparatus that compares a detected image obtained by image capturing with a recorded image to carry out authentication using the detected image and recorded image, the apparatus comprising:
   an image-capturing unit that obtains the detected image by capturing an image of a photographed subject;
   a display unit that displays on a screen a target image showing an outline of the recorded image, and displays the detected image along with the target image; and a controlling unit that controls a lens of the image-capturing unit to locate the lens at a given focusing position relative to the photographed subject upon obtaining the detected image, wherein the target image showing an outline of the recorded image is obtained by modifying an inherent value of a target image with a shape of the outline of the recorded image, and the controlling unit, according to determination that a position of an outline of the detected image matches a position of the outline shown by the target image, focuses the image-capturing unit on the photographed subject, or takes the detected image, the determination made by the controlling unit.

2. The image authenticating apparatus of claim 1, wherein the target image shows a recommended position or a recommendable form for image capturing of a portion to be detected.

3. The image authenticating apparatus of claim 1, wherein the controlling unit detects a gap between the outline shown by the target image and the outline of the detected image, controls the image-capturing unit, and matches a position of the detected image to a position of the target image.

4. An image authenticating method for comparing a detected image obtained by image capturing with a recorded image to carry out authentication using the detected image and recorded image, the method comprising:

obtaining the detected image by capturing an image of a photographed subject;

generating a target image showing an outline of the recorded image by modifying an inherent value of a target image with a shape of the outline of the recorded image;

displaying on a screen the target image showing an outline of the recorded image, and displaying the detected image along with the target image;

controlling a lens of an image-capturing unit to locate the lens at a given focusing position relative to the photographed subject upon obtaining the detected image;

determining that a position of an outline of the detected image matches a position of the outline shown by the target image; and according to the determining, focusing the image-capturing unit on the photographed subject, or taking the detected image.

5. A computer-readable recording medium that stores an image authenticating program for causing a computer to execute a process of comparing a detected image obtained by image capturing with a recorded image to carry out authentication using the detected image and recorded image, the image authenticating program stored in the recording medium comprising:

obtaining the detected image by capturing an image of a photographed subject;

generating a target image showing an outline of the recorded image by modifying an inherent value of a target image with a shape of the outline of the recorded image;

displaying on a screen the target image showing an outline of the recorded image, and displaying the detected image along with the target image;

controlling a lens of an image-capturing unit to locate the lens at a given focusing position relative to the photographed subject upon obtaining the detected image;

determining that a position of an outline of the detected image matches a position of the outline shown by the target image; and according to the determining, focusing the image-capturing unit on the photographed subject, or taking the detected image.

6. An electronic device that compares a detected image obtained by image capturing with a recorded image to carry out authentication using the detected image and recorded image, the device comprising:

an image-capturing unit that obtains the detected image by capturing an image of a photographed subject;

a display unit that displays on a screen a target image showing an outline of the recorded image, and displays the detected image along with the target image; and a controlling unit that controls a lens of the image-capturing unit to locate the lens at a given focusing position relative to the photographed subject upon obtaining the detected image, wherein the target image showing an outline of the recorded image is obtained by modifying an inherent value of a target image with a shape of the outline of the recorded image, and the controlling unit, according to determination that a position of an outline of the detected image matches a position of the outline shown by the target image, focuses the image-capturing unit on the photographed subject, or takes the detected image, the determination made by the controlling unit.

7. A circuit substrate incorporated into an image authenticating apparatus that compares a detected image obtained by image capturing with a recorded image to carry out authentication using the detected image and recorded image, the substrate displaying a target image showing an outline of the recorded image, the substrate generating display output for displaying the detected image along with the target image, the substrate having a controlling unit that controls a lens of an image-capturing unit to locate the lens at a given focusing position relative to the photographed subject upon obtaining the detected image to be displayed, wherein the target image showing an outline of the recorded image is obtained by modifying an inherent value of a target image with a shape of the outline of the recorded image, and the controlling unit, according to determination that a position of an outline of the detected image matches a position of the outline shown by the target image, focuses the image-capturing unit on the photographed subject, or takes the detected image, the determination made by the controlling unit.

* * * * *